(12) United States Patent
McDonald et al.

(10) Patent No.: US 6,401,983 B1
(45) Date of Patent: Jun. 11, 2002

(54) BULK CARGO CONTAINER

(75) Inventors: Harley C. McDonald; Matthew C. McDonald, both of Omaha, NE (US)

(73) Assignee: Composite Structures, Inc., Omaha, NE (US)

(*) Notice: Subject to any disclaimer, the term of this patent is extended or adjusted under 35 U.S.C. 154(b) by 0 days.

(21) Appl. No.: 09/454,271

(22) Filed: Dec. 3, 1999

Related U.S. Application Data

(63) Continuation-in-part of application No. 09/363,500, filed on Jul. 7, 1999, which is a continuation of application No. 08/987,319, filed on Dec. 9, 1997, which is a continuation-in-part of application No. 08/987,705, filed on Dec. 9, 1997, now Pat. No. 6,059,372.

(51) Int. Cl.$^7$ ............................................. B65D 88/26
(52) U.S. Cl. ........................ 222/181.2; 220/1.5; 220/1.6; 222/561
(58) Field of Search .................. 220/1.6, 645, 642, 220/495.11, 23.89, 1.5; 119/52.1, 56.2, 74; 4/506, 592, 595, 584; 222/185.1, 561, 181.2, 181.3

(56) References Cited

U.S. PATENT DOCUMENTS 1,709,701 A * 4/1929 Althoff .................. 220/495.11
2,616,758 A    11/1952 Meyers (List continued on next page.)

FOREIGN PATENT DOCUMENTS

| FR | 1322948 | 4/1963 |
|----|---------|--------|
| WO | 89/02404 | * 3/1989 |

* cited by examiner

Primary Examiner—Lee Young
Assistant Examiner—Joseph C. Merek
(74) Attorney, Agent, or Firm—Suiter & Associates PC; Kevin E. West

(57) ABSTRACT

A bulk cargo container is disclosed for storing, transporting or processing solid or liquid bulk materials. The bulk cargo container includes a vessel suitable for containing the bulk material and a supporting frame assembly having a generally horizontally disposed support member attachment. In an exemplary embodiment, the vessel is formed of fiber reinforced plastic material and includes a container portion and a support member. The container portion is formed into at least one hopper having a discharge opening therein suitable for discharging bulk material contained within the vessel. The vessel is supported from the support member attachment via the support member so that the weight of the bulk material is carried in tension by the fiber reinforced plastic material of the vessels shell.

68 Claims, 13 Drawing Sheets

U.S. PATENT DOCUMENTS

| | | | |
|---|---|---|---|
| D170,969 S | 12/1953 | Clough | |
| 3,139,286 A | 6/1964 | Johnson | |
| 3,337,086 A | * 8/1967 | Jenks | 220/495.11 |
| 3,397,654 A | * 8/1968 | Snyder | 105/305 |
| 3,605,352 A | 9/1971 | Ruggles et al. | |
| 3,679,086 A | * 7/1972 | Grimm et al. | 220/23.89 |
| 3,755,830 A | * 9/1973 | Johns | 4/585 |
| 4,106,643 A | * 8/1978 | McGhee | 414/528 |
| 4,170,045 A | 10/1979 | Estes | |
| 4,292,898 A | * 10/1981 | Gordon et al. | 105/238.1 |
| D265,982 S | 8/1982 | Miller | |
| 4,398,653 A | 8/1983 | Daloisio | |
| 4,497,258 A | 2/1985 | Ruhmann et al. | |
| 4,608,931 A | 9/1986 | Ruhmann et al. | |
| D290,591 S | 6/1987 | Shirvanian | |
| 4,729,570 A | * 3/1988 | Welch, Jr. | 280/837 |
| 4,756,445 A | * 7/1988 | Agee, Sr. | 220/23.89 |
| D296,999 S | 8/1988 | Morse | |
| 4,818,024 A | 4/1989 | Michel | |
| 4,970,734 A | 11/1990 | Friedman et al. | |
| 4,995,522 A | * 2/1991 | Barr | 220/1.5 |
| 5,024,346 A | 6/1991 | Roser | |
| 5,108,038 A | 4/1992 | Palladino et al. | |
| 5,269,436 A | 12/1993 | Bachmann | |
| 5,294,186 A | 3/1994 | DeCap | |
| 5,324,097 A | 6/1994 | Decap | |
| 5,326,156 A | 7/1994 | Heider et al. | |
| D349,872 S | 8/1994 | Chaseling et al. | |
| 5,341,527 A | 8/1994 | Schmidt et al. | |
| 5,346,286 A | 9/1994 | Oberle | |
| 5,417,165 A | * 5/1995 | Peppin et al. | 105/250 |
| 5,443,211 A | * 8/1995 | Young et al. | 239/146 |
| 5,529,222 A | * 6/1996 | Toth et al. | 222/181.3 |
| 5,960,974 A | * 10/1999 | Kee et al. | 220/1.5 |
| 6,059,372 A | * 5/2000 | McDonald et al. | 298/8 H |

BULK CARGO CONTAINER

CROSS REFERENCE TO RELATED APPLICATIONS

The present application is a continuation-in-part of U.S. patent application Ser. No. 09/363,500, filed Jul. 7, 1999, which is a continuation of U.S. patent application Ser. No. 08/987,319, filed Dec. 9, 1997. The present application is also a continuation-in-part of U.S. patent application Ser. No. 08/987,705, filed Dec. 9, 1997 now U.S. Pat. No. 6,059,372. Said U.S. patent applications Ser. Nos. 09/363,500, 08/987,319 and 08/987,705 are herein incorporated by reference in their entirety.

The present application further claims the benefit under 35 U.S.C. §119(e) of the U.S. Provisional Application Ser. No. 60/167,861 filed Nov. 29, 1999, Express Mail Label No. EL 280 285 208 Said U.S. Provisional Application Ser. No. 60/167,861 Express Mail Label No. EL 280 285 208 US, is herein incorporated by reference in its entirety.

FILED OF THE INVENTION

The present invention relates generally to field of containers utilized for storing, transporting or processing bulk materials. More specifically, the present invention relates to a bulk cargo container employing a container having a thin elastic shell comprised of fiber reinforced plastic (FRP) supported along its upper edge by a frame assembly, wherein the high tension carrying capabilities of FRP are utilized to support the bulk materials contained within the container. The present invention further relates to a bulk cargo container having one or more hoppers suitable for discharging bulk material contained in the container.

BACKGROUND OF THE INVENTION

Large containers suitable for storing, transporting or processing solid or liquid bulk materials, especially those containers complying with standards promulgated by the International Organization for Standardization (ISO) [hereinafter ISO containers], have traditionally been fabricated from steel or aluminum panels welded, bolted or riveted together to form a generally box shaped vessel having flat side and bottom walls. Because of the large loads exerted by the weight of the contained bulk material, the panels utilized in constructing the walls and bottom of the vessel must be relatively thick, or must further be reinforced with supporting structure such as ribs, support beams and the like capable of withstanding the large loads applied by the bulk material contained in the vessel. As a result, containers fabricated in such a way tend to be heavy and require a significant amount of labor to fabricate. Seams, crevices and other protrusions formed in the bottom and side walls of the vessel may leak. Further, metals such as steel and aluminum are subject to corrosion, especially when utilized to store or transport corrosive materials such as fertilizers.

Fabrication of large containers of non-metallic materials such as fiber reinforced plastic materials (FRP) offers many advantages over fabrication techniques using steel and aluminum. FRP materials are not subject to corrosion, making it an ideal material for containers utilized to store and/or transport corrosive materials such as fertilizers and the like. Further, FRP materials are substantially lighter than steel or aluminum thereby reducing the weight of the container.

However, the use of FRP materials in the construction of such containers presents many unique problems not encountered with metal containers. FRP materials usually have a lower modulus of elasticity in bending than metals such as steel or aluminum. Consequently, the side and bottom walls of the vessel must be made thicker, and supporting structure such as reinforcing ribs or beams must be provided to support the FRP. Further, the cross-members of this supporting structure must be placed closer together to resist the bending forces to prevent unacceptable deflection which could shatter the FRP. As a result, much of the weight savings realized by using the lighter FRP materials may be lost. Further, because of the increased complexity of such reinforcing structure, the cost of manufacturing FRP containers places them at a cost disadvantage with respect to containers made of steel or aluminum. Nevertheless, because FRP materials are much more resistant to corrosion than steel and aluminum, such materials would be the material of choice for use in manufacturing lightweight vessels and those containing liquids or corrosive materials if the disadvantages associated with its low modulus of elasticity in bending could be overcome thereby eliminating the need for greater material thicknesses and complicated supporting structures.

Present containers do not provide an efficient means for removing bulk materials stored therein. For example, standard ISO containers are loaded and unloaded via doors formed in an end of the container. When solid or liquid bulk material is to be held in such containers, liners may be installed to prevent spillage of the material. Other containers, for example, open-top ISO containers, may comprise tub-like vessels having an open top through which bulk materials can be loaded. The bulk material must then be unloaded through the container's end doors, if provided, or via the top opening. As a result, unloading of the material from such containers is time consuming and/or may require additional heavy equipment.

SUMMARY OF THE INVENTION

Accordingly, the present invention is directed to a bulk cargo container for storing, transporting or processing solid or liquid bulk materials.

In accordance with a first aspect of the present invention, the bulk cargo container is comprised of a vessel having a thin elastic shell comprised of fiber reinforced plastic (FRP) material wherein the high tension carrying capabilities of FRP material are utilized to support the bulk materials contained within the vessel. In one embodiment, the vessel is supported from its upper perimeter via a support member so that the weight of the bulk material contained within the vessel is carried primarily in tension by the FRP material of the vessel's thin shell. A supporting frame assembly supports the vessel and the bulk material contained therein via the support member. A cover assembly may further be provided for covering bulk material contained within the vessel. The cover may include an arched upper surface having one or more door assemblies for allowing the container to be filled with bulk material.

In accordance with a second aspect of the present invention, the bulk cargo container is comprised of a vessel that includes at least one discharge assembly or hopper having an opening therein suitable for discharging bulk material contained within the vessel. In exemplary embodiments, discharge apparatus such as a conveyor or an auger may be provided for removing bulk material discharged from the hoppers through the openings.

It is to be understood that both the foregoing general description and the following detailed description are exemplary and explanatory only and are not restrictive of the

BRIEF DESCRIPTION OF THE DRAWINGS

The numerous objects and advantages of the present invention may be better understood by those skilled in the art by reference to the accompanying figures in which.

DESCRIPTION OF THE INVENTION

Figure 1:
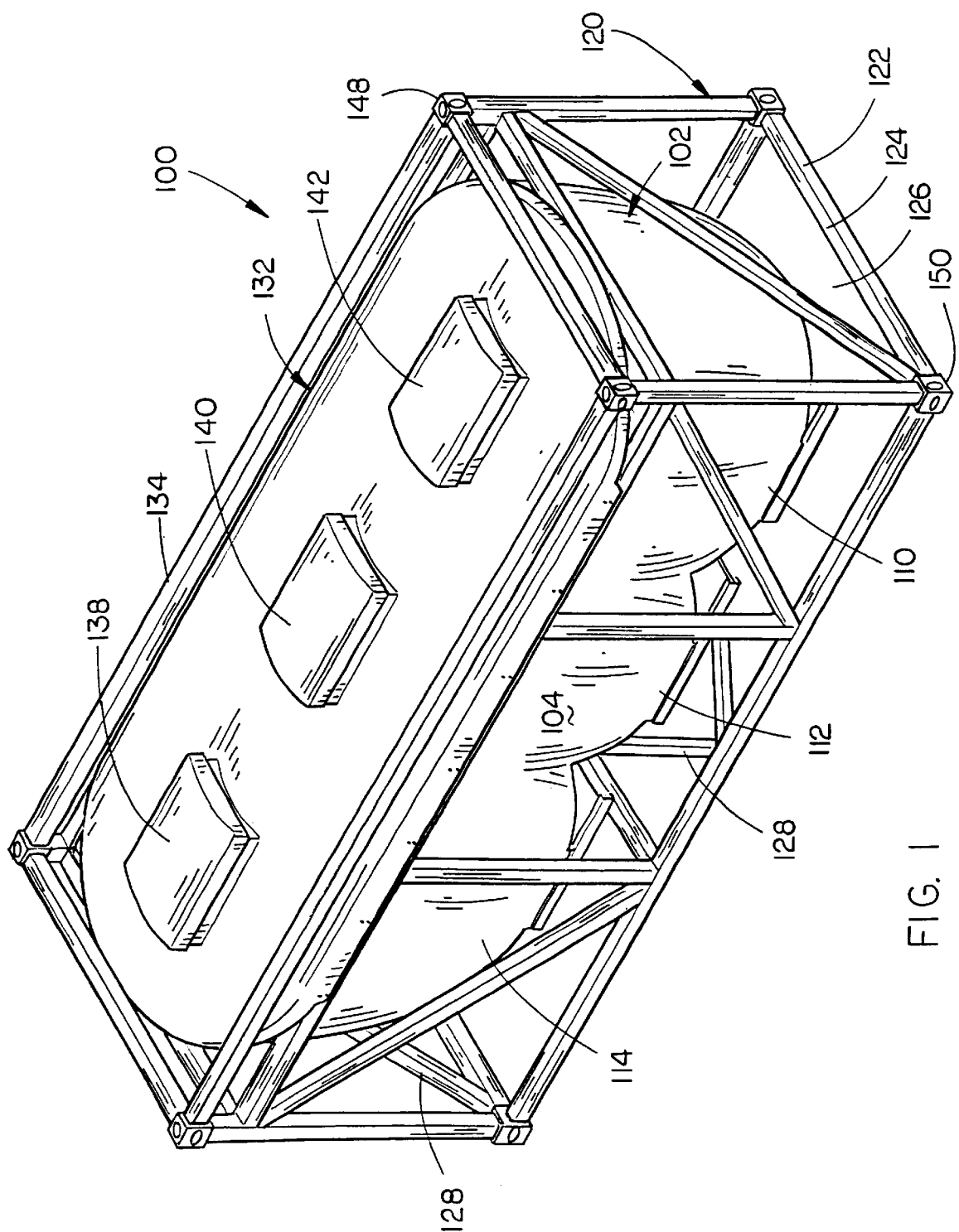
FIG. 1 is an isometric view illustrating a bulk cargo container in accordance with an exemplary embodiment of the present invention.

Reference will now be made in detail to the presently preferred embodiments of the invention, examples of which are illustrated in the accompanying drawings.

Referring generally to FIGS. 1 through 12B, a bulk cargo container in accordance with an exemplary embodiment of the invention is described. The bulk cargo container 100 includes a vessel 102 suitable for containing solid and/or liquid bulk material for storage and transportation. The vessel 102 is fabricated of a thin, elastic fiber reinforced plastic (FRP) material shell 104 and is comprised of an open-topped container portion 106 suitable for holding the bulk material and a support member 108 for supporting the vessel 102 and the bulk material contained therein. The container portion 106 may include at least one discharge assembly or hopper (three hoppers 110, 112, 114 are shown herein), each having a discharge opening 116 suitable for discharging the bulk material contained within the vessel 102. The support member 108 is formed along the perimeter of the container portion's upper rim 118 for engaging a supporting frame assembly 120 to support the vessel 102 and the bulk material contained therein in suspension. The shape of the thin shell 104 of the vessel 102 allows the vessel 102 to be supported from the support member 108 so the weight of the bulk material contained therein is carried in tension by the FRP material. In this manner, the need of supporting structure such as reinforcing ribs, beams and the like to compensate for bending forces in the shell 104 is eliminated and the shell 104 may be made thinner and lighter without compromising its integrity.

Figure 2:
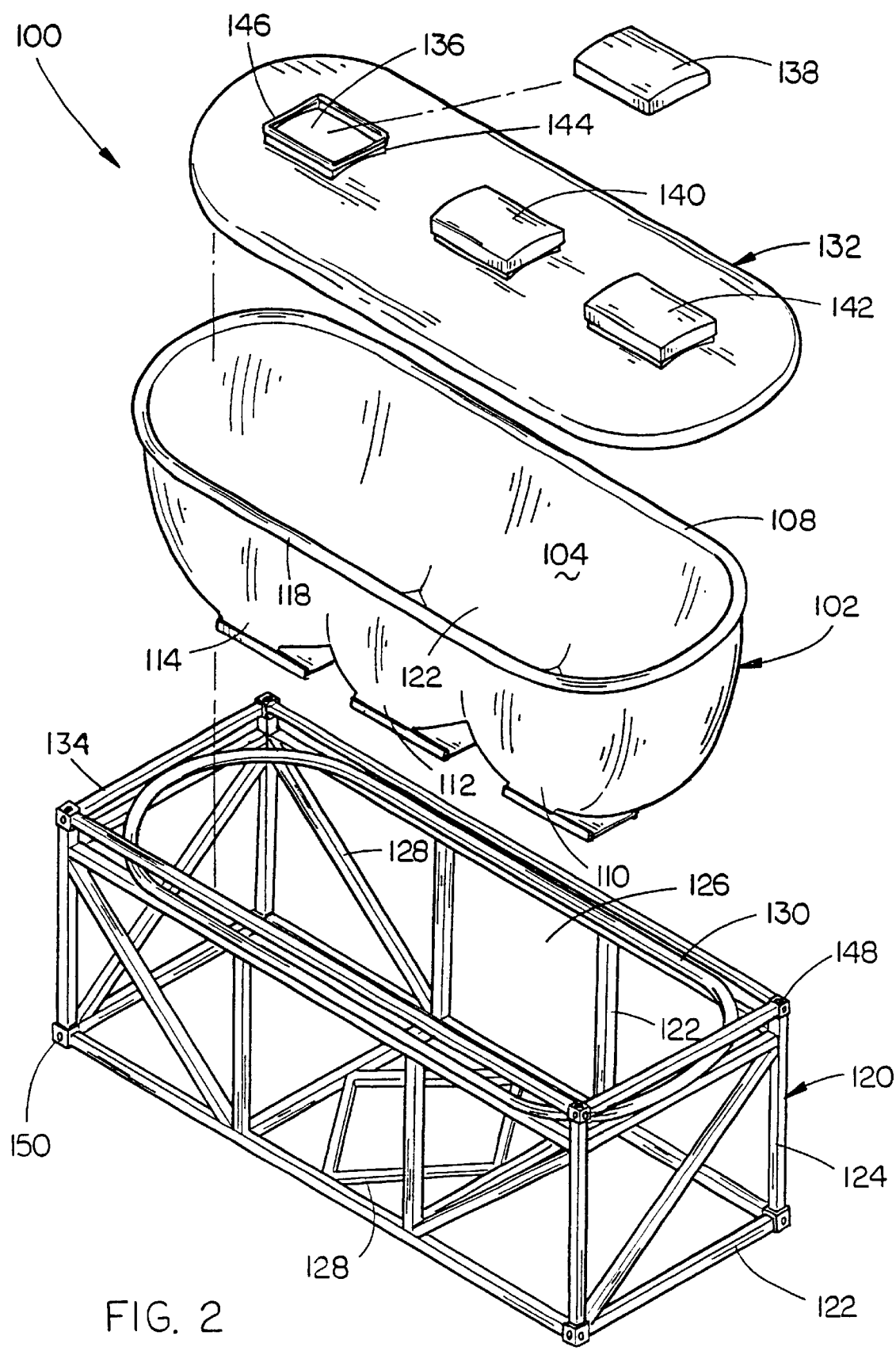
FIG. 2 is an exploded isometric view of the bulk cargo container shown in FIG. 1, further illustrating the vessel, support frame assembly and cover assembly.
Figure 3:
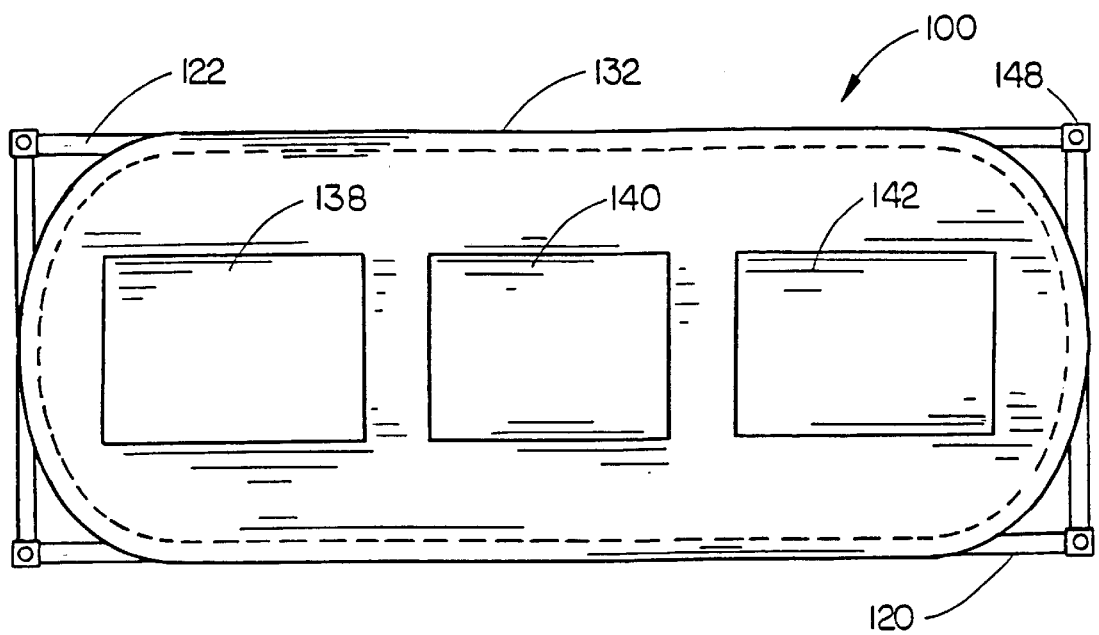
FIG. 3 is a top plan view of the bulk cargo container shown in FIG. 1, illustrating further detail of the cover assembly.
Figure 6:
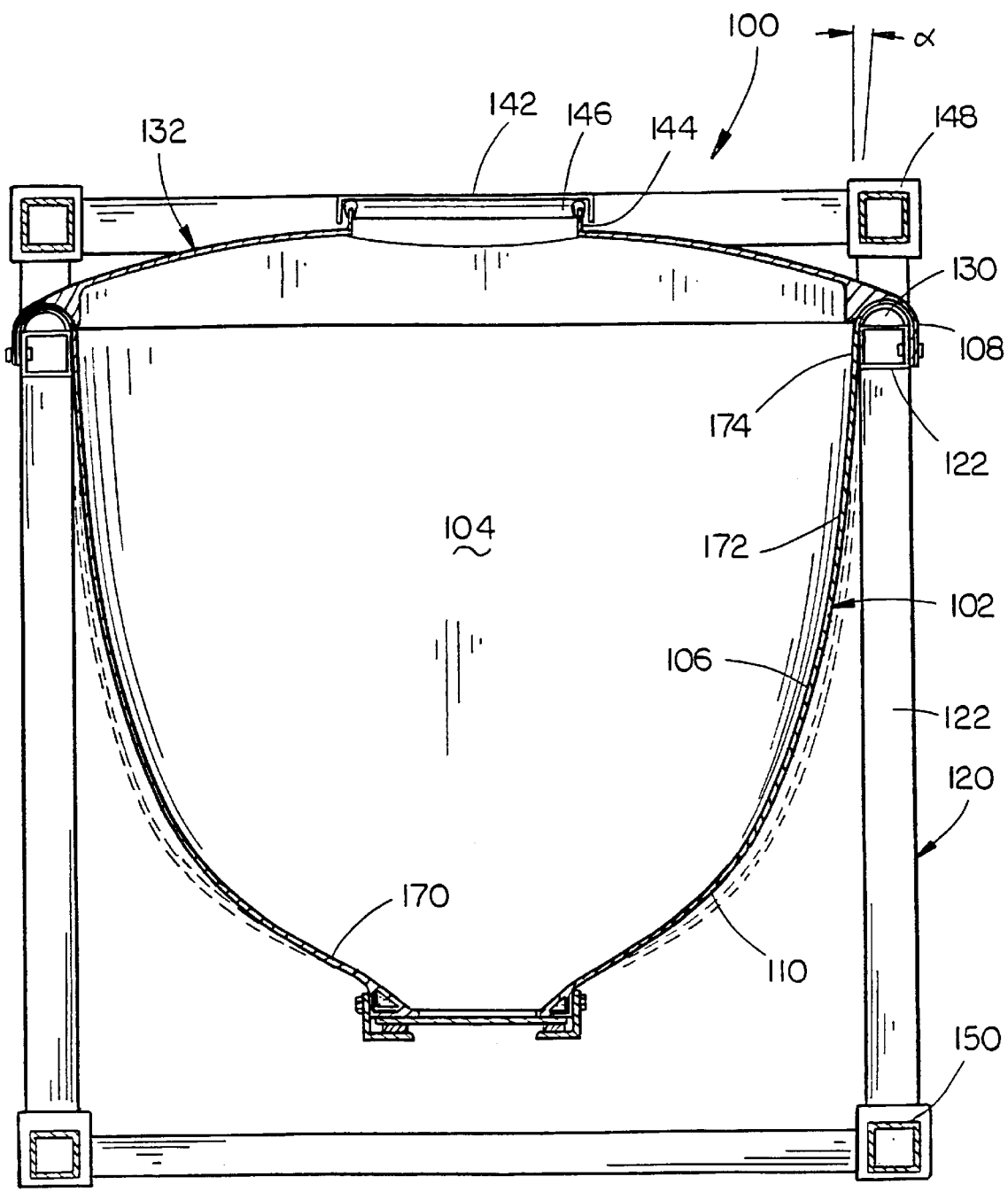
FIG. 6 is a partial cross-sectional end elevational view of the bulk cargo container shown in FIG. 1 taken along plane 6—6 through a hopper of the vessel.

As shown in FIGS. 1, 2 and 6, the supporting frame assembly 120 may be comprised of a plurality of horizontal and vertical structural members 122 attached together to form an open, box-like cage 124 having an interior volume 126 capable of containing the vessel 102. Diagonal bracing members 128 may further be employed to provide additional stiffness to the cage 124. Each member 122 & 128 may be formed of steel tubing having a generally square cross-section (e.g., 4×4 and 2×2 inch square steel tubing) joined together via a suitable fastening means such as welding, bolting, riveting or the like. The vessel 102 is supported within the cage 124 from a generally horizontally disposed support member attachment 130 positioned at least adjacent to the support member 108. The support member 108 engages the support member attachment 130 to support the weight of the vessel 102 and bulk material contained therein such that the weight is carried in tension in the thin shell of the vessel. As shown in FIG. 1, the vessel 102 may fit completely within the open volume 126 of the cage 124 so that members 122 & 128 of the support frame assembly 120 do not contact the FRP material of the vessel's shell 104. Further, the cage 124 may be of sufficient height so that bottom surfaces of the vessel 102 do not contact the supporting surface on which the bulk cargo container 100 rests, e.g., the ground, a warehouse floor, the deck of a container ship, a truck bed, or the like. In this manner, the vessel 102 is suspended within the support frame assembly 120 so that bending forces are not unnecessarily induced in the FRP material of the thin shell 104.

It should be appreciated that while a cage-like design utilizing square steel tube members is shown herein in an exemplary embodiment of the invention, the supporting frame assembly 120 may be fabricated to have many other configurations. For instance, an exemplary supporting frame assembly 120 may have solid walls instead of utilizing an open cage design. Similarly, members 122 & 128 may be fabricated of materials other than steel such as aluminum, composites, plastics and the like and may have cross sections other than square (e.g., round, I-beam, C-channel, etc.)

As shown in FIGS. 1, 2, 3, 6, 9A and 9B, a cover assembly 132 may be provided for covering bulk material contained within the vessel 102. The cover assembly 132, like the vessel 102 itself, may be comprised of a thin, elastic fiber reinforced plastic (FRP) material shell. In one embodiment, the cover assembly 132 may have a convexly arched upper surface. The arched upper surface makes it possible for the FRP material to support increased loads such as, for example, the weight of workers standing on the cover assembly 132 while, inspecting, loading and/or unloading the vessel 102. A guard rail member 134 may be provided about the perimeter of the supporting frame assembly 120 above the support member attachment 108 to prevent damage to the cover assembly 132 due to inadvertent contact between the cover assembly 132 and structures exterior to the support frame assembly 120.

In one embodiment, the cover assembly may include one or more openings 136 for allowing the container to be filled with bulk material and optionally for venting dust or fumes from the bulk material contained within the vessel. Door assemblies (three door assemblies 138, 140 & 142 are shown) may cover the openings 136 in cover assembly 132 to prevent spillage and/or environmental contamination of the bulk material contained within the vessel 102. As shown in FIG. 2, in an exemplary embodiment, each door assembly 138, 140 & 142 may rest on a raised frame 146 surrounding the opening 136 and may be completely removable therefrom to allow access to the openings for filling the vessel. Alternately, the door assemblies 138, 140 & 142 maybe hinged to the frame 144 or may be slidably attached thereto via tracks or rails so that the door assemblies 138, 140 & 142 remain attached to the cover assembly 132 while opened. A gasket or seal 146 may be placed over the upper edge of raised frame 144 to provide an environmental seal between the frame 144 and door assembly 138, 140 & 142 while the door assembly 138, 140 & 142 is closed.

Bulk cargo containers 100 of the present invention may be manufactured in accordance with accepted storage and shipping container standards regarding size, dimension, weight and the like. For instance, in an exemplary embodiment, the supporting frame assemblies 120 of bulk cargo containers 100 of the present invention may have dimensions complying with standards promulgated by the International Organization for Standardization (ISO) for height, width, and length, thus allowing the containers to employed in existing shipping or storage environments utilizing ISO standardized containers.

Figure 7:
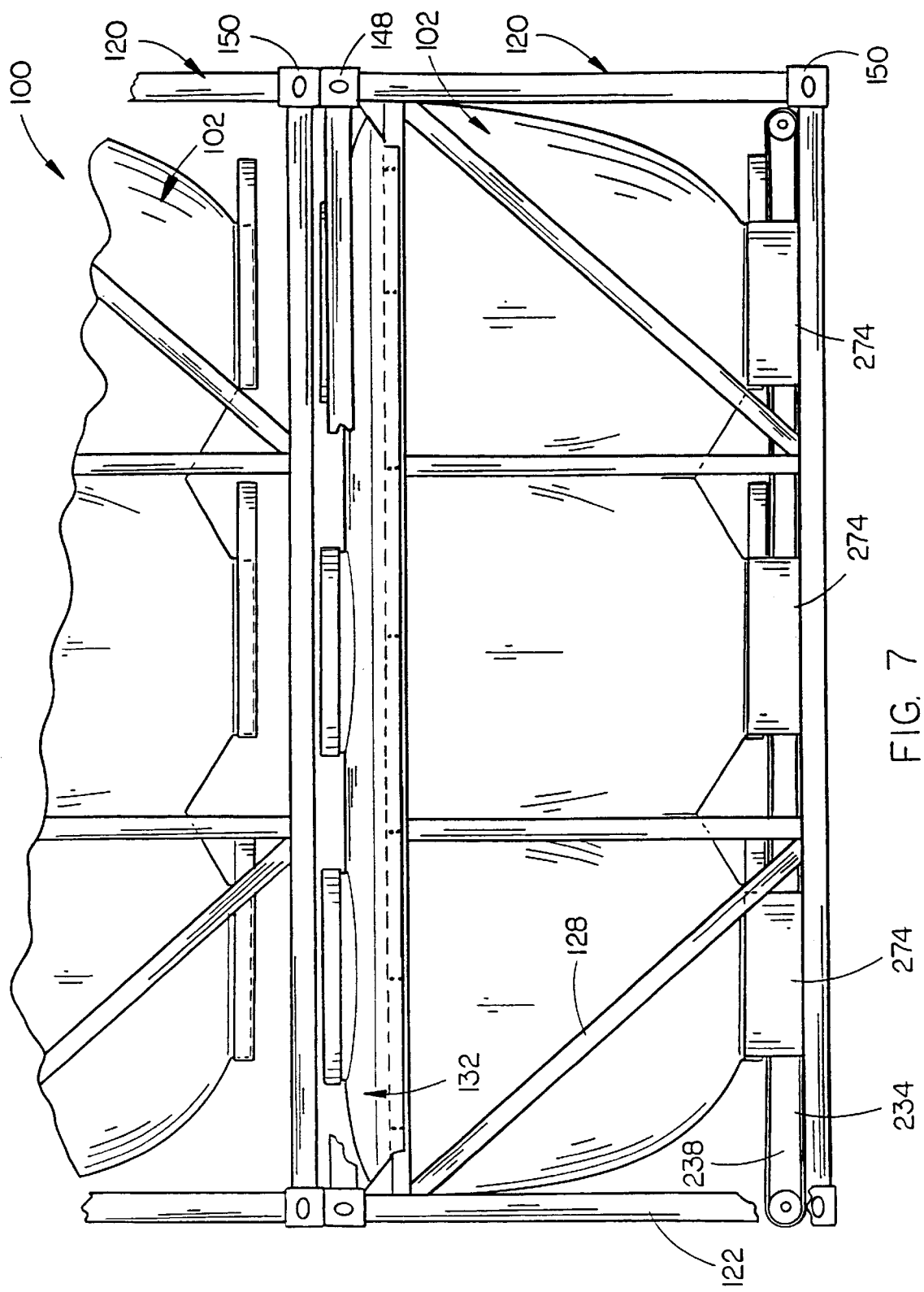
FIG. 7 is a side elevational view illustrating exemplary bulk cargo containers, such as the bulk cargo container shown in FIG. 1, stacked one on top of the other, and further illustrating an exemplary bulk material removal system for removing bulk material discharged from the container.

Similarly, as shown most clearly in FIGS. 1, 2 and 7, the supporting frame assembly 120 of the bulk cargo container 100 may include standardized corner fittings 148 & 150 providing a support for stacking one container onto the supporting frame assembly of a second container (as shown in FIG. 7), or for anchoring the container 100 to a supporting surface (e.g., a ships hold or deck, a truck bed, a trailer, a railroad car, and the like). Further, the corner fittings 148 & 150 may provide connection points for lifting and moving the container. As shown in FIGS. 1 and 6, the upper corner fittings 148 may extend above the cage 124 of the support frame assembly 120 to accommodate the added height of the support member attachment 130 and cover assembly 132. In an exemplary embodiment, corner fittings 148 & 150 comprise ISO (International Organization for Standardization) compliant corner fittings utilized for stacking, lifting, and moving such bulk containers. Use of ISO compliant corner fitting allows bulk cargo containers 100 of the present invention to be stacked with other types of ISO compliant containers of the same size for shipping, storage, or the like and to be manipulated using ISO compliant hoist apparatus.

Referring now to FIGS. 1 through 6, the vessel of the bulk cargo container of the present invention is described in detail. As shown in FIGS. 1, 2, 4, and 5, the sides of container portion 106 have complex, convexly curved surfaces that transition into the hoppers 110, 112, 114. The hoppers 110, 112, 114 serve to further contain the bulk material in the vessel 102 for storage and shipment and provide a means for discharging the material from the vessel 102 by gravity.

Figure 4:
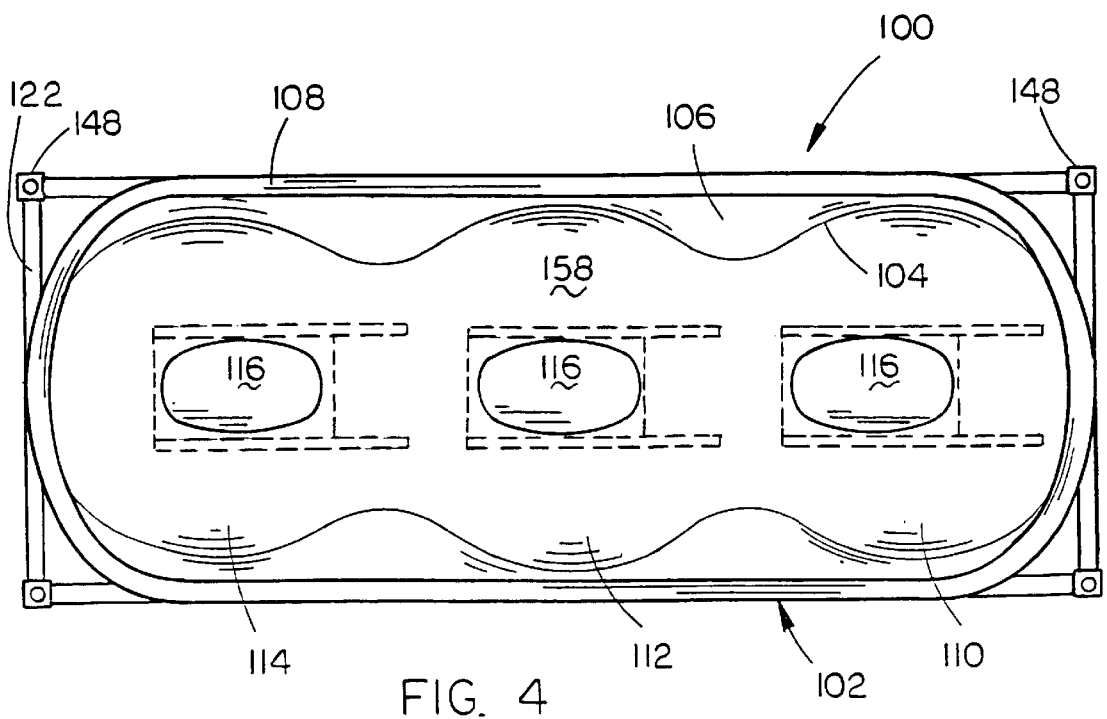
FIG. 4 is a top plan view of the bulk cargo container shown in FIG. 1, wherein the cover assembly is shown removed to further illustrate the interior of the bottom portion of the vessel, and wherein the vessel includes a single compartment.

In one embodiment, shown in FIG. 4, the vessel 102 may be comprised of a single compartment 158 having no internal dividers. Thus, for vessels 102 including multiple hoppers, each hopper 110, 112, 114 may discharge bulk material from the entire vessel 102 at least to the level where the container portion 106 divides into the hoppers 110, 112, 114.

Figure 5:
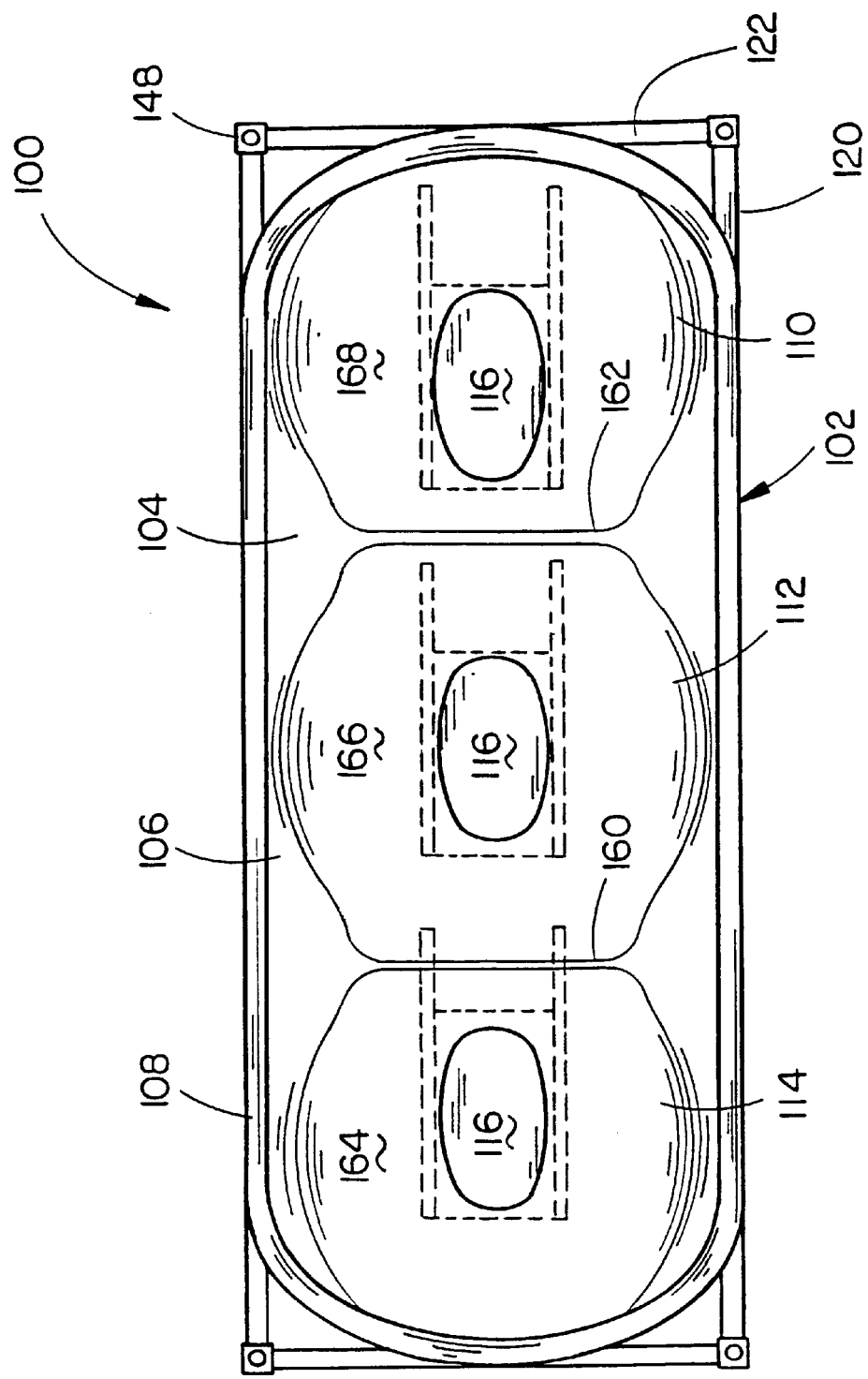
FIG. 5 is a top plan view of the bulk container shown in FIG. 1, wherein the cover is shown removed to further illustrate the interior of the bottom portion of the vessel, and wherein the vessel includes multiple compartments.

Alternately, as shown in FIG. 5, internal dividing walls 160 & 162 may separate the vessel 102 into two or more compartments 164, 166 & 168. Each such compartment 164, 166 & 168 may include one or more hoppers 110, 112, 114. In an exemplary embodiment, dividing walls 160 & 162 may be formed of FRP material and may be integrally molded within the vessel 102 as it is manufactured.

As discussed supra., and shown in FIGS. 4 and 5, each hopper 110, 112, 114 includes a discharge opening 116 formed therein. In the exemplary embodiment described herein, the discharge opening 116 may have a rounded, e.g., oval, elliptical or circular, shape suitable for the discharge of particulate bulk material. As shown in FIG. 6, the side walls 170 of each hopper 110, 112 & 114 may radiate linearly outward and upward from the discharge opening 116 at an angle so as to form a truncated cone suitable for the smooth flow of material from the vessel 102 via the hopper 110, 112 & 114. In an exemplary embodiment, the side walls 170 may form an angle of approximately thirty-three degrees (33°) with the bottom of the hopper 110, 112 & 114. It has been found that this angle allows efficient flow of bulk materials from the hoppers 110, 112 & 114 through the discharge opening 116 while allowing loads imposed by the bulk material to be carried in tension by the thin shell 104. However, it will be appreciated hoppers 110, 112 & 114 having side walls 170 with other slopes are possible.

The side walls 170 of hoppers 110, 112 & 114 transition into the side walls 172 of container portion 106 which curve upwardly to allow the thin shell 104 to transfer loads induced therein by the bulk materials contained in the vessel 102 to the supporting frame assembly 120 in such a manner that the horizontal forces imposed thereon are substantially minimized. When viewed in cross-section through a hopper, such as hopper 110, the shell 104 of vessel 102 may have a convexly rounded V-shaped or hemi-ellipsoidal shape throughout a majority of the vessel 102 except where altered to accommodate the discharge opening 116.

Figure 8A:
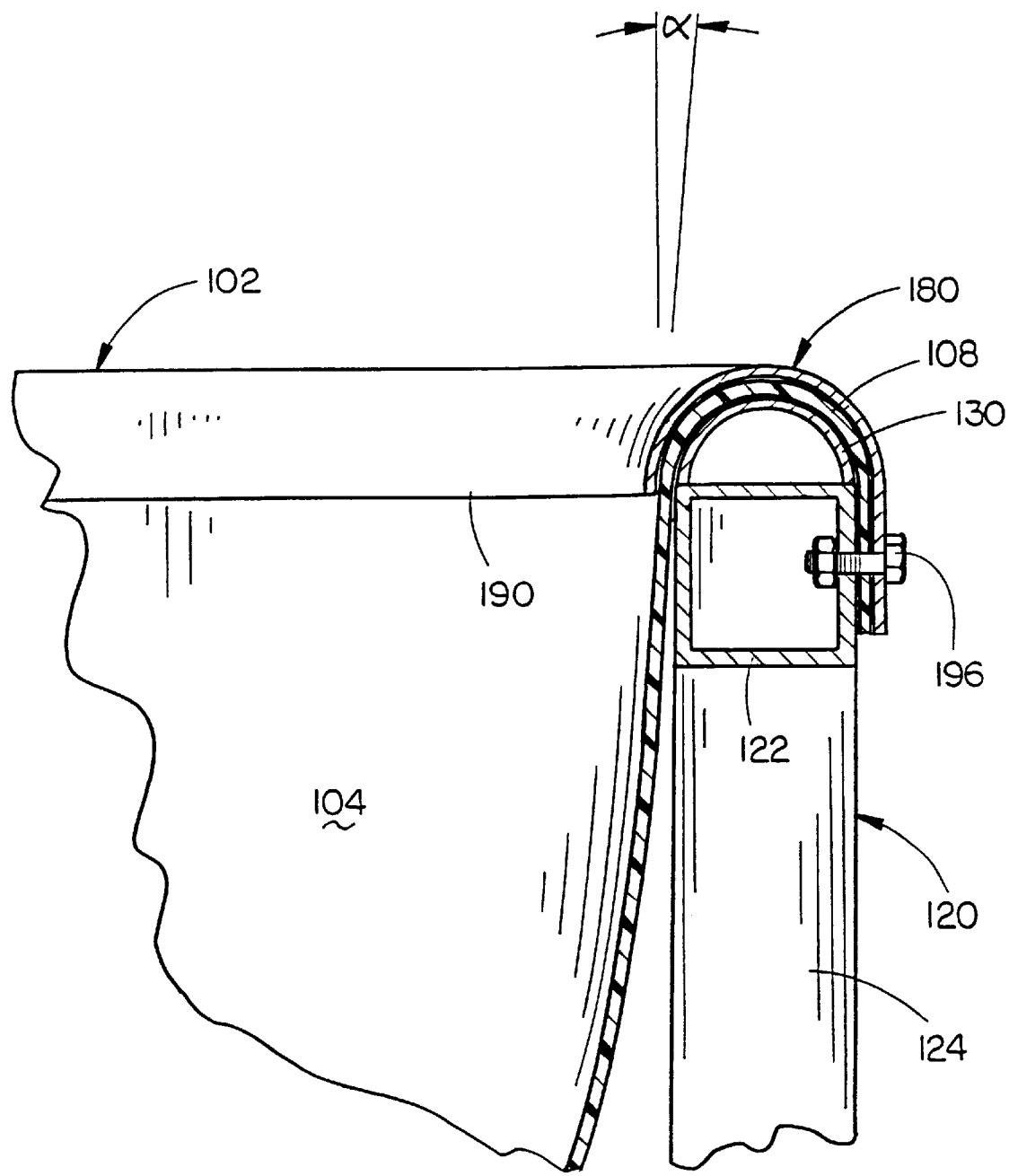
FIG. 8A is a partial cross-sectional view illustrating detail of the interface between the support frame assembly and vessel of an exemplary bulk cargo container in accordance with the present invention wherein the cover assembly is removed.
Figure 8B:
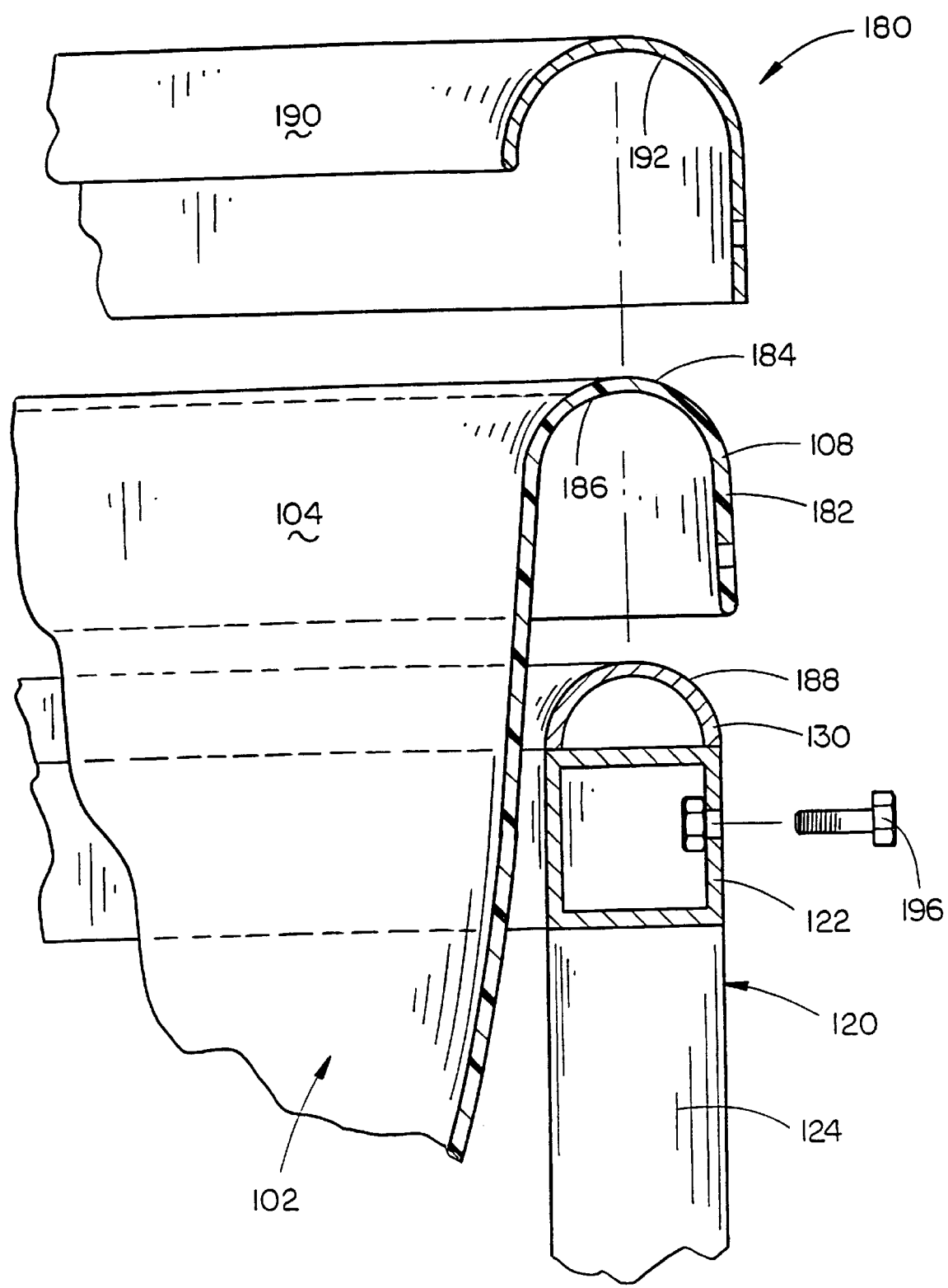
FIG. 8B is an exploded view of the interface shown in FIG. 8A.
Figure 9A:
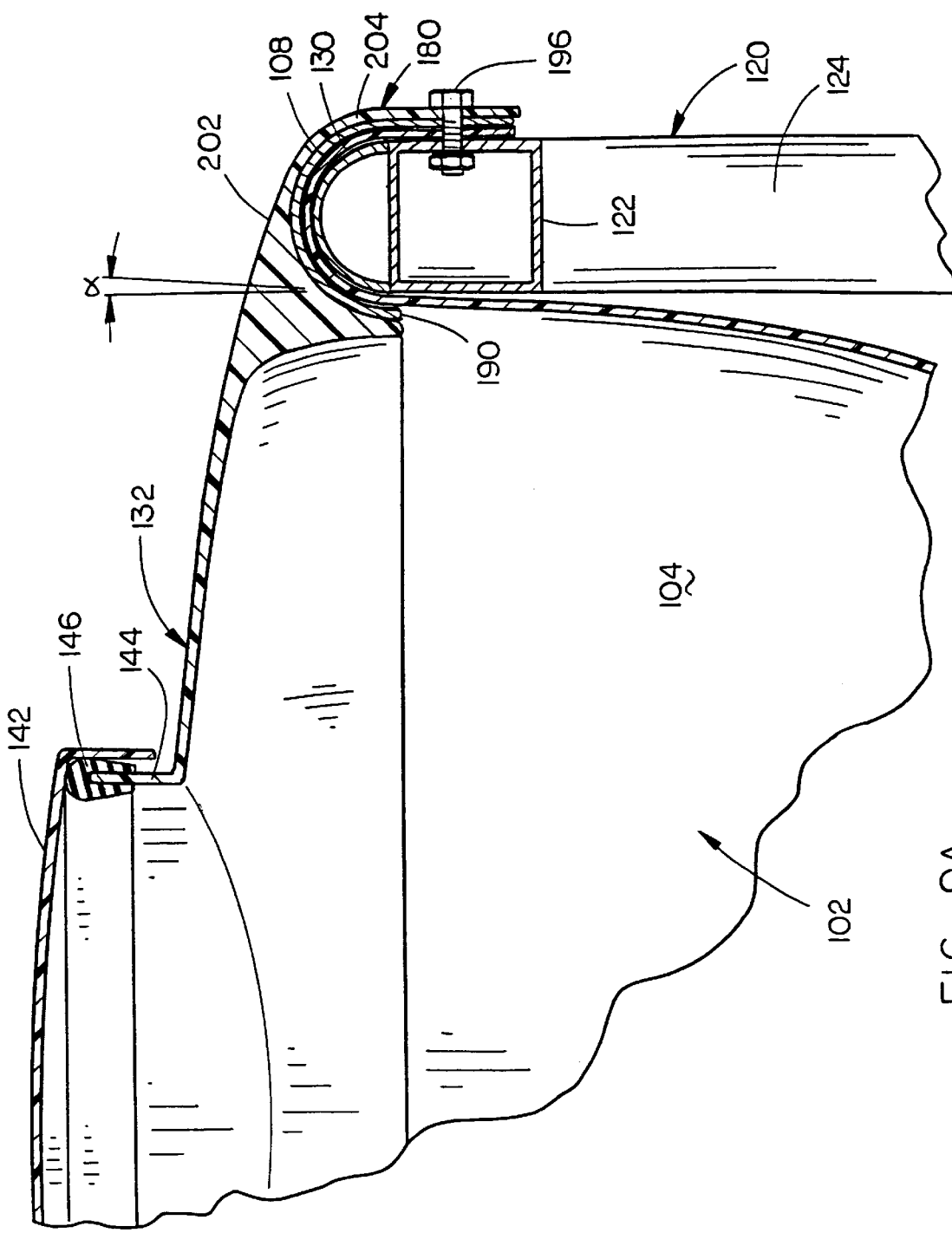
FIG. 9A is a partial cross-sectional view illustrating detail of the interface between the vessel and support frame and cover assemblies of an exemplary bulk cargo container in accordance with the present invention.

In an exemplary embodiment, the side walls 170 & 172 of the vessel 102 form an angle ($\alpha$) with a generally vertical plane and may approach an orientation slightly less than vertical within the area 174 adjacent to support member 108. As shown in FIGS. 6, 8A and 9A, moving along the sidewall in a generally downward direction away from support member 108, it can be seen that the angle ($\alpha$) increases since the side walls 171 & 172 are generally convexly curved through much of their cross-sections. The angle ($\alpha$) is selected to prevent bulging of the side walls 170 & 172 due to horizontal forces exerted on the FRP thin shell of the side walls 170 & 172 by the bulk material contained within the vessel 102. For example, at one extreme, if an angle ($\alpha$) approaching zero degrees ($\alpha \rightarrow 0°$) with the vertical plane is selected, the horizontal component of the force exerted in the side walls 172 by bulk material contained within the vessel 102 is increased, reaching a maximum when the angle ($\alpha$) is equal to zero degrees ($\alpha = 0°$). At the other extreme, wherein the side walls 172 are constructed so as to form a shallow angle ($\alpha$), that is, an angle ($\alpha$) approaching ninety degrees ($\alpha \rightarrow 90°$), the horizontal component of the force exerted in the side walls 172 by bulk material contained within the vessel 102 is reduced and is theoretically eliminated entirely when the angle ($\alpha$) is equal to ninety degrees ($\alpha = 90°$). Thus, it can be seen that if the angle ($\alpha$) is made too deep, the force exerted by the bulk material contained within the vessel 102 would be essentially perpendicular to the side walls 172, causing the FRP material of the side walls 170 & 172 to bulge. Alternately, if the angle ($\alpha$) is made too shallow, the capacity of the vessel 102 is unnecessarily limited.

Further, by allowing the side walls 172 to approach an orientation slightly less than vertical such that angle ($\alpha$) approaches zero degrees ($\alpha \rightarrow 0°$), within the area 174 adjacent to support member 108 horizontal component of the load transferred to support member attachment 130 by the FRP thin shell, which is in tension, is reduced resulting in a lower horizontal moment within the supporting frame assembly 120. As a result, the supporting frame assembly may be made lighter than would otherwise be possible.

It should be appreciated that while a vessel having three hoppers 110, 112 & 114 is shown and described herein, vessels 102 manufactured in accordance with the present invention may include a different number of hoppers depending on the particular application for which the bulk cargo container 10 is designed. Further, while each of the hoppers 110, 112 & 114 shown herein are similar in shape, the individual shapes of the hoppers need not be identical. For example, for bulk cargo containers 100 wherein the vessel 102 includes multiple compartments, as shown in FIG. 5, each compartment may employ a hopper optimized for carrying a specific type of bulk material (i.e., fluid, fine solid, coarse solid, etc.). Thus, in one embodiment, the shape of one or more hoppers may be optimized for storage and discharge of bulk particulate materials such as grains, solid fertilizers, and the like, while other discharge assemblies of the same vessel are optimized for storage and discharge of liquid bulk materials such as liquid pesticides or herbicides.

As shown in FIGS. 1 and 6, the vessel 102 is supported from the support member attachment 130 so the weight of the bulk material contained therein is carried in tension by the FRP material of the vessel's thin shell 104. Thus, the side walls 170 & 172 of the container portion 106 and hoppers 110, 112 & 114 of vessel 102 are shaped to maximize the high tensile strength and elasticity of the FRP material of the thin shell 104. In this manner, the need for a reinforcing structure such as reinforcing ribs, beams, or the like and/or thicker walls is eliminated since bending loads placed on the FRP material are maintained within acceptable limits. This reduces the weight of the vessel 102, improves the flow of material during discharge and simplifies the fabrication or construction of the vessel 102.

The side walls 170 & 172 of the container portion 106 and hoppers 110, 112 & 114 of vessel 102 may further be shaped to conform to the loads applied by the contained bulk material and to accommodate discharge of the bulk material through discharge openings 116 formed in hoppers 110, 112 & 114. For example, as generally shown in FIG. 6, the thin shell 104 may deflect or stretch as load is applied (i.e., bulk material is loaded into the vessel 102) to accomplish this purpose. Thus, when the hoppers 110, 112 & 114 are closed, and the vessel 102 contains bulk material, the side walls 170 & 172 of the container portion 106 and hoppers 110, 112 & 114 of vessel 102 deflect and assume a more effective shape to carry the loads exerted by the weight of the contained bulk material. For instance, the side walls 172 within the area 174 adjacent to support member 108 deflect downward so as to more closely approach a vertical orientation, i.e., the angle ($\alpha$) between the side walls 172 and a vertical orientation is reduced, so that the added loads may be carried within the thin shell 104 in tension. As the bulk material is discharged through one or more of the hoppers 110, 112 & 114, such that the weight of the bulk material is reduced, the stress in the thin shell 104 is at least partially relieved and the side walls 170 & 172, being elastic, regain a more optimum shape or slope for discharging the remaining bulk material. When all bulk material is discharged from the vessel 102, the side walls 170 & 172, now substantially unloaded, regain their approximate original shape.

In an exemplary embodiment, the FRP material of thin shell 104 is formed of thin sheets of material having fibers of materials such as glass (e.g., fiberglass) or carbon (e.g., carbon epoxy) laminated together and encapsulated in a resin. The sheets are overlapped onto an mold having the shape of the interior of the vessel so that the fibers of the sheets are generally oriented along the transverse and longitudinal axis of the vessel 102. Additional sheets may be oriented so that their fibers are aligned along load paths incurred by the thin shell 104, or at orientations oblique to the transverse and longitudinal axes. Overlap of the sheets causes the orientation of the fibers in the sheets to intersect providing additional strength to the thin shell 104. The width of the overlap and the number of layers of the sheets may vary, depending on the load to be carried in the vessel 102. The thin shell 104 is completed by placing an outer mold having the shape of the exterior surface of vessel 102 over the first mold and fiber material. Resin is then injecting in the cavity between the two molds to encapsulate the fiber material. The resin is then cured and the completed vessel 102 is removed from the molds.

Referring now to FIGS. 8A, 8B, 9A and 9B, the interface of the support member and the support member attachment in accordance with an exemplary embodiment of the present invention is described. When fiber reinforced plastic (FRP) materials are utilized in load carrying applications such as the present bulk cargo container 100, it has been discovered that vibration causes wear and fracture at connecting points and interfaces between the FRP material and metal connecting or supporting structure. Specifically, FRP materials may fracture at points of high stress concentration, such as fastener (e.g., bolt or rivet) holes. Therefore, when FRP materials that are subject to high impact or vibration are joined with metal supporting structures using fasteners, such as bolts or rivets, localized fractures may develop around the fastener holes which may then propagate and cause complete failure of the FRP material at the metal structure interface.

In accordance with one aspect of the present invention, the interface 180 between the vessel 102 and supporting frame assembly 120 of the of the present invention allows loads to be uniformly distributed in the FRP material of the thin shell 104 across substantially the entire cross-section of the support member 108 thereby eliminating localized stress build-up and possible failure of the FRP material. As shown in FIGS. 8A, 8B, 9A and 9B, the support member 108 is comprised of a portion of the thin shell 104 formed so as to have an inverted, generally U-shaped cross-section 182 including U-shaped upper and lower surfaces 184 & 186. Similarly, the support member attachment 130 has an inverted, generally curved or U-shaped upper surface 188 complimentary to the shape of the support member 108. As shown, the support member attachment 130 may have a radius slightly smaller than the radius of the lower surface 186 of support member 108. This feature allows the FRP material of the support member 108 to be molded over the support member attachment 130 so that the support member 108 rests on the support member attachment 130. In an exemplary embodiment, the support member attachment 130 is comprised of a semi-circular channel formed of a metal such as steel, aluminum, or the like welded to the upper horizontal structural members 122 of cage 124. Alternatively, the support member attachment 130 may be made of non-metallic materials such as plastic, composites, or the like attached to upper horizontal structural member 122 of cage 124.

A clamping member 190 having an inverted, generally U-shaped lower surface 192 is placed over the upper surface 184 of support member 108. In an exemplary embodiment, the clamping member 190 is comprised of a semi-circular channel formed of a metal such as steel, aluminum, or the like.

The support member attachment 130, support member 108, and clamping member 190 may be further joined together via fasteners 196 such as bolts, rivets, screws or the like extending through the outer portions of clamping member 190 and support member 108 into upper horizontal structural member 122, or alternately support member attachment 130. In high load carrying applications, the support member 108 may be further bonded to the support member attachment 130 via an adhesive placed between the lower surface 186 of support member 108 and the upper surface 188 of support member attachment 130. Similarly, the clamping member 190 may be bonded to the upper surface 184 of support member 108 via adhesive disposed between its lower surface 192 and the upper surface 184 of support member 108. In one embodiment, the fasteners 196 may be installed while the adhesive is uncured so as to clamp the members together as the adhesive cures. In this manner, once the adhesive is cured, the support member attachment 130, support member 108 and clamping member 190 are bonded together to become a single unit or assembly.

Figure 9B:
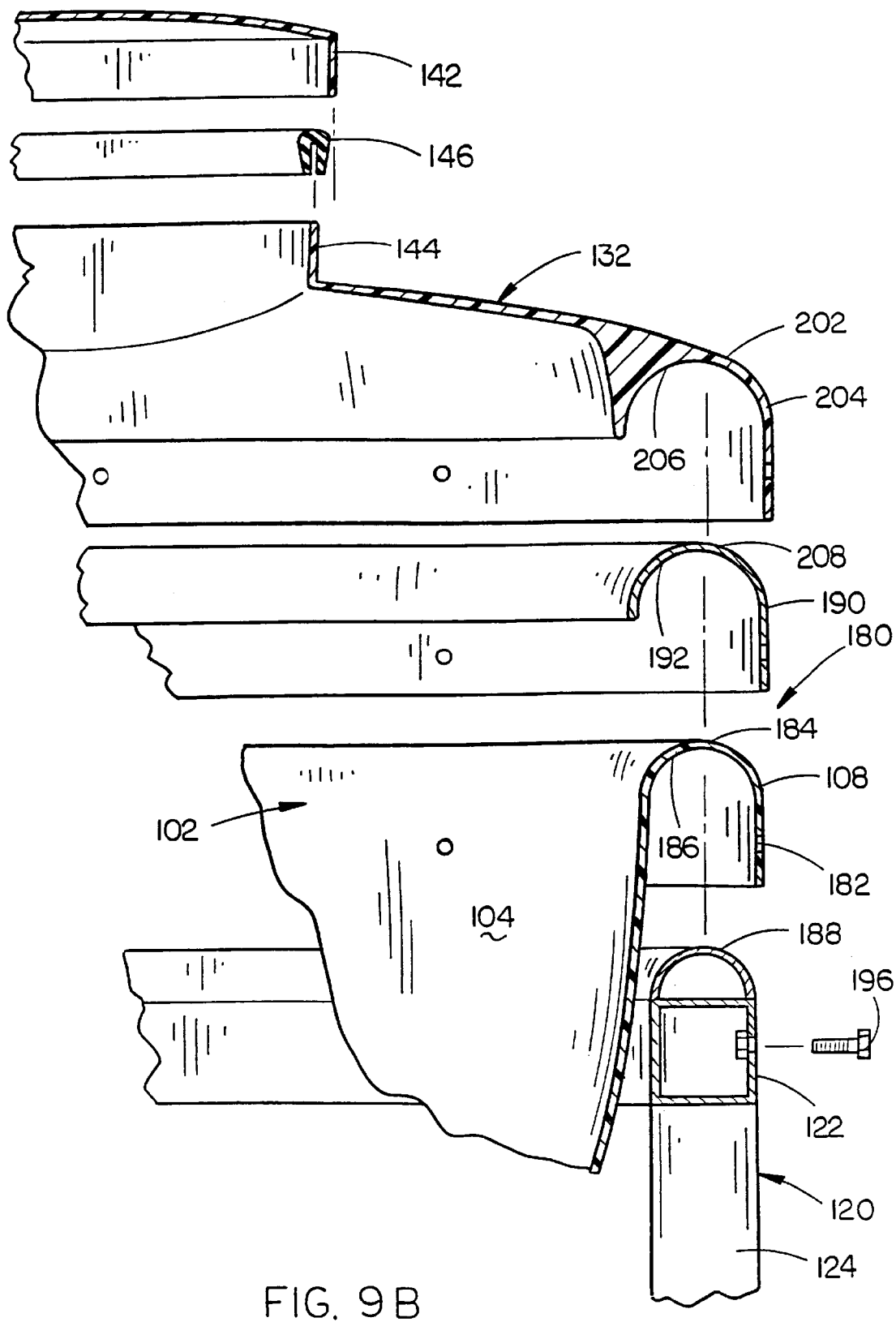
FIG. 9B is an exploded view of the interface shown in FIG. 9A.
Figure 10:
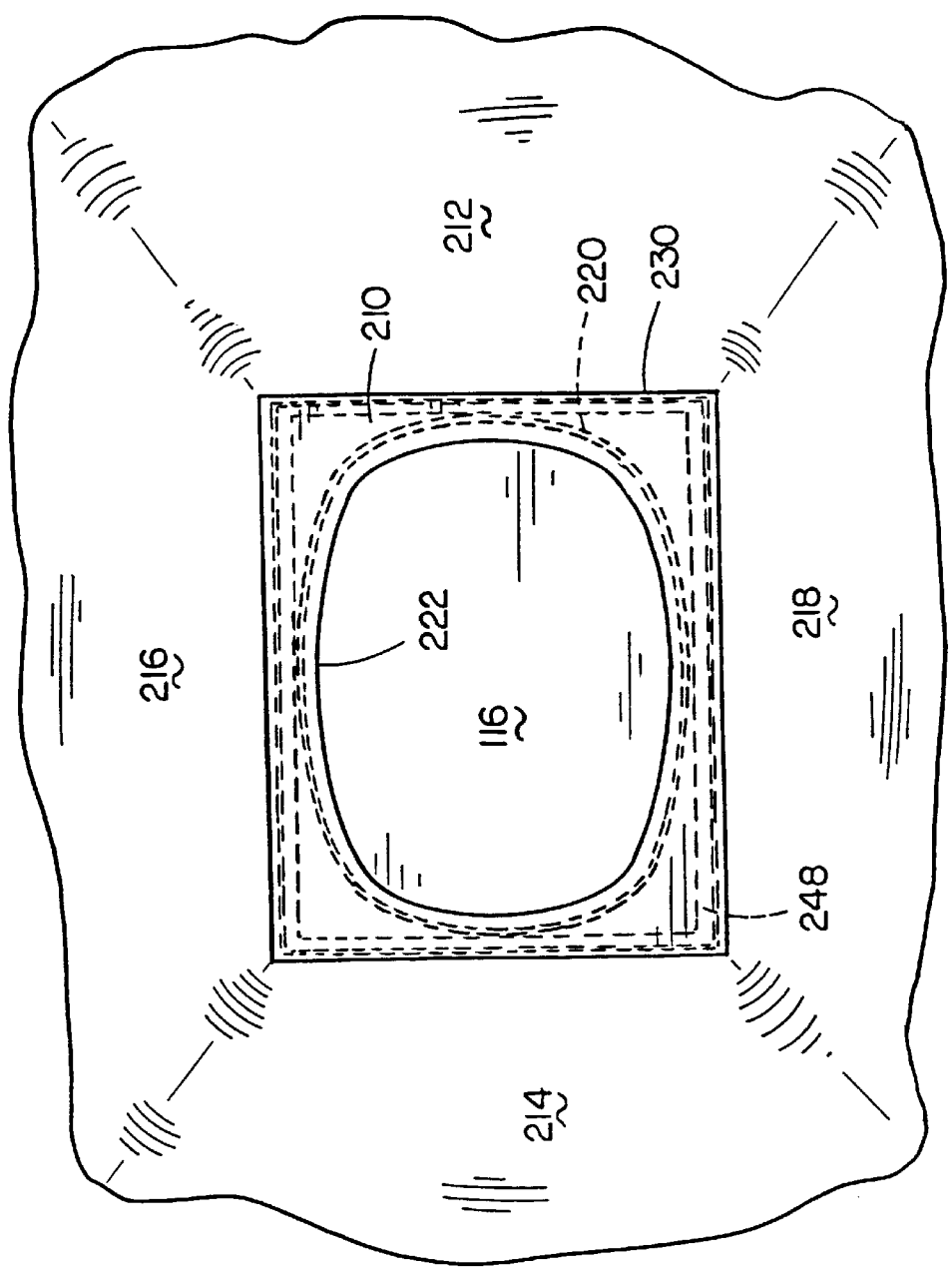
FIG. 10 is a partial top plan view of the discharge assembly of an exemplary bulk cargo container in accordance with an exemplary embodiment of the present invention.

As further shown in FIGS. 9A and 9B, the perimeter edge 202 of cover assembly 132 may also include a lip 204 having a generally U-shaped lower surface 206 sized to fit over the upper surface 208 of the clamping member 190. When the cover assembly 132 is installed on the vessel 102, as shown in FIG. 9A, fasteners 196 may be installed through the outer portion of the lip 204 to attach the cover assembly 132 to the upper horizontal structural members 122 of the supporting frame assembly 120. Optionally, adhesive may also be applied between the lower surface 206 of lip 204 and the upper surface 208 of clamping member 190 to provide more permanent attachment of the cover assembly 132.

Tensile forces are transferred to the support member attachment 130 through the increased friction between the support member 108 and the support member attachment 130 as the FRP material of the support member 108 passes over the support member attachment 130 and the direction of the force in the thin shell 104 is reversed. As loads are applied to the vessel 102, tensile forces in the thin shell are transferred into the support member attachment 130 along the top edge of the U as substantially vertical loads having little or no horizontal component. These vertical loads increase friction between the upper surface 188 of the support member attachment 130 and the lower surface 186 of support member 108 enhancing the adhesive bond.

In high load carrying applications, tensile forces in the thin shell 104 of support member 108 are further uniformly transferred to the support member attachment 130 and clamping member 190 by the action of the adhesive. With clamping member 190 clamped in place by fasteners 196, the forces transferred to the clamping member 190 by the adhesive between the support member 108 and clamping member 190 may be transferred to the support member attachment 130 through the fasteners 196 and by virtue of the U shape of the support member attachment 130, support member 108, and clamping member 190. In this manner, the uniform transfer of high tensile shell stress over a relatively short distance is provided without incurring concentrated loads in the FRP material of the thin shell 104 which could cause localized failures of the material and possibly total failure of the vessel/supporting frame interface. The adhesive and fasteners 196 may further alleviate bending forces in the FRP material where thin shell 104 passes over the U-shaped upper surface 188 of the support member attachment 130 so that tension is the primary force in the FRP material.

The adhesive utilized to bond the support member attachment 130, support member 108, and clamping member 190 together may be flexible and elastic when cured. In this manner, as load is applied to the thin shell 104, as when the vessel 102 is loaded with bulk material, movement of the support member 108 over the support member attachment 130 is resisted by the adhesive. The adhesive thus reduces any tendency of the support member 108 to straighten and slip off of the support member attachment 130. Further, FRP material of the support member 108 may have internal flexural strength preventing it from unwrapping as forces in the thin shell 106 tend to pull it over the support member attachment 130.

The present invention thus provides for uniform transfer of the tensile loads in thin shell 104 of the vessel 102 to the support frame assembly 120 over the relatively large surface area of the U-shaped support member attachment 130. As a result, points of highly concentrated loads that could cause failure may be eliminated. The low modulus of elasticity of the FRP material plus the shape of the support member 108 and support member attachment 130 and optionally the elasticity of the adhesive, work together to absorb or dampen impact and vibration loading and prevent the buildup of concentrated stresses. In this manner, a very light weight extremely strong fiber reinforced plastic vessel 102 capable of carrying large loads under highly dynamic impact and vibration conditions is possible.

Referring now to FIGS. 10, 11A, 11B, 12A and 12B, the structure of a discharge opening of an exemplary hopper is described. The hopper (hopper 110 is shown) may be substantially symmetrical about its transverse and longitudinal center lines and may include a bottom portion 210, a forward wall portion 212, a rearward wall portion 214, and opposite side wall portions 216 & 218. As shown in FIG. 8A, discharge opening 116 is formed in and occupies substantially all of the bottom portion 210. Forward wall portion 212, rearward wall portion 214 and side wall portions 216 & 218 extend upwardly and outwardly from the bottom portion 210 and are shaped to channel bulk material to the discharge opening 116 for discharge of the material from the vessel 102.

The discharge opening 116 is encircled by a tension ring 220 comprised of a continuous bundle of fibers molded within the FRP material of the thin shell 104 adjacent to the opening's rim 222. The tension ring 220 ties the longitudinally and transversely oriented sheets of fiber material of the thin shell 104 in position at the opening's perimeter and distributes tensile loads in the FRP material near the rim 222 to prevent excessive deformation of the discharge opening 116 under load. In this manner, the need for supporting structure, such as a metal frame or the like, to carry loads at the opening is eliminated. In exemplary embodiments of the invention, the tension ring 220 may be formed of a plurality of glass or carbon fibers bundled and embedded in the FRP material during fabrication of the hopper 110.

The discharge opening 116 is surrounded externally by an integrally molded, rectangular reinforcing frame 230 further strengthening the thin shell 104 adjacent to the discharge opening 116 and providing a surface to which mounting brackets 232 may be attached for mounting discharge apparatus 234 such as a slide gate 236, a conveyor 238, an auger 240, or the like. The reinforcing frame 230 is comprised of a core 242 formed of a structural foam material such a polyurethane positioned against the side walls 170 of the hopper 110 and imbedded in FRP material. As shown in FIGS. 11A, 11B, 12A, 12B, each perimeter side of the core 242 may have a generally triangular cross-sectional shape filling a large part of the area between the sloped outer surface of the hopper side walls 170 and vertical and horizontal surfaces 244 & 246 extending from the side walls 170 at the bottom of the hopper 110 and giving the reinforcing frame 230 its rectangular shape.

A discharge assembly support 248 may be embedded in the FRP material of the reinforcing frame 230 to which mounting brackets 232 may be attached for mounting a discharge apparatus 234. In one embodiment, the support 248 may comprise elongated metal angles or plates 250 having vertical and horizontal side surfaces 252 & 254. The elongated metal angles 250 are encased in FRP material adjacent to the structural foam core 242 on each side of discharge opening 116 so that vertical and horizontal surfaces 252 & 254 are adjacent to the vertical and horizontal surfaces 244 & 246. The mounting brackets 232 are secured to the supports 248 by fasteners 256 such as bolts, rivets, screws or the like that extend through the outer FRP material shell 258 into the supports 248. In the exemplary embodiment shown in FIGS. 1A, 11B, 12A and 12B, the mounting brackets 232 are attached by bolts that are drilled and tapped into the vertical surfaces 252 of the elongated metal angles 250 forming supports 248.

Figure 11A:
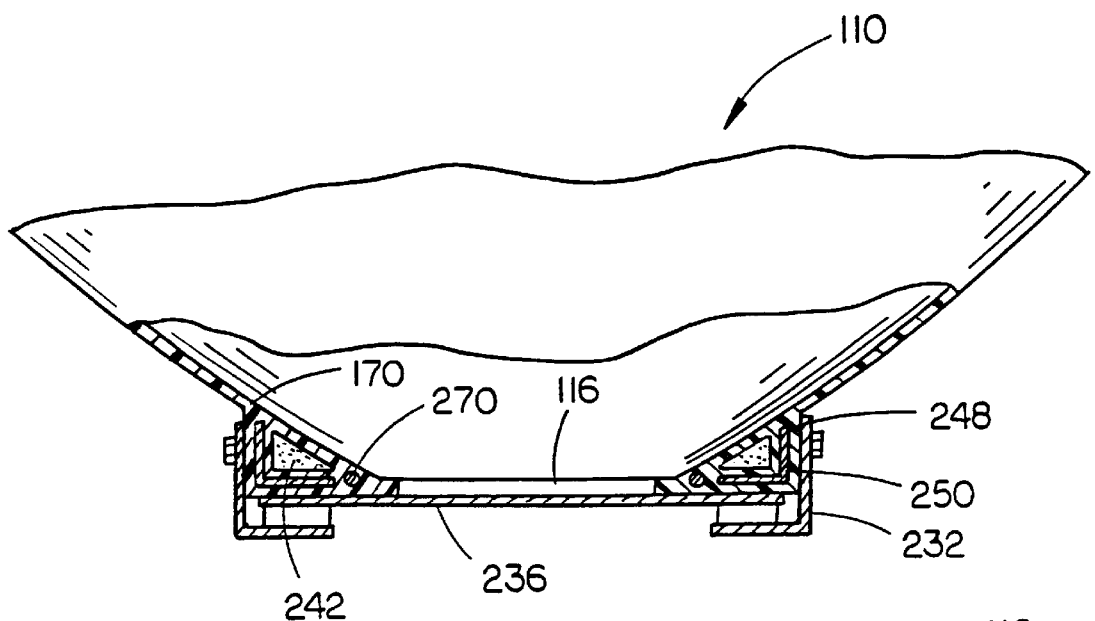
FIG. 11A is a partial cross-sectional side elevational view of an exemplary hopper employing a slide gate assembly.
Figure 11B:
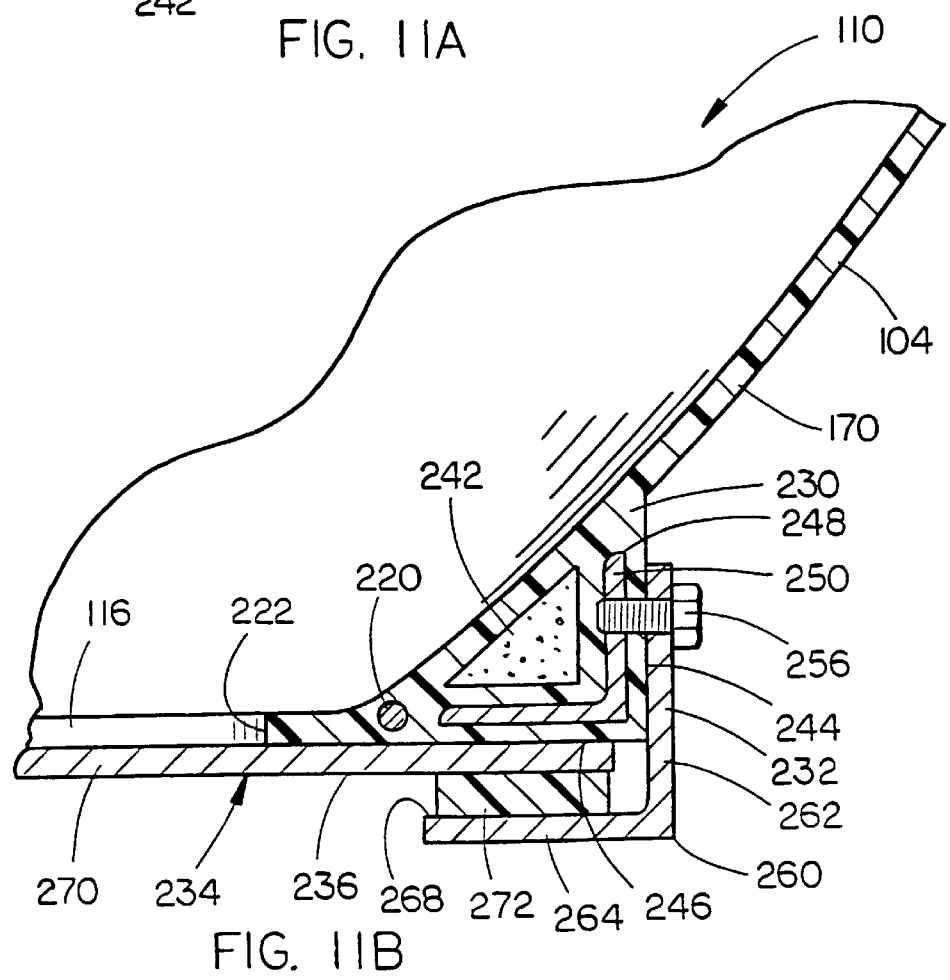
FIG. 11B is a partial cross-sectional side elevational view of the discharge assembly shown in FIG. 11A further illustrating details of the reinforcing frame of the hopper and the slide gate attachment.

A slide gate 236 may be mounted to the reinforcing frame 230 so that discharge opening 116 may be selectively opened and closed. As shown in FIGS. 11A and 11B, the mounting brackets 232 may be generally angular in shape having an upper vertical portion 262 and a lower horizontal portion 264 forming a slide gate frame 266. The upper vertical portion 262 provides attachment to the reinforcing frame 230 via the discharge assembly supports 248. The lower horizontal portion 264 includes an upper surface 268 upon which the slide gate door 270 slides. A friction reducing material 272, for example Teflon® (a registered trademark of E.I. du Pont de Nemours and Company), may be affixed to the upper surface 268 for reducing friction between the slide gate door 270 and the frame 266. In exemplary embodiments, the slide gate door 270 may be selectively opened and closed by means of a conventional hand crank assembly, a motor, or hydraulic or pneumatic actuators (not shown) to allow or prevent flow of bulk material from the hopper 110 via the discharge opening 116. When the slide gate door 270 is closed, and bulk material is contained within the hopper 110, the load carried on slide gate door 270 is transferred to the mounting brackets 232 and discharge assembly supports 248 via fasteners 256. The discharge assembly supports 248 uniformly distribute the slide gate load to reinforcing frame 230 which in turn distributes the load uniformly into the side walls 170 of the hopper 110.

Figure 12A:
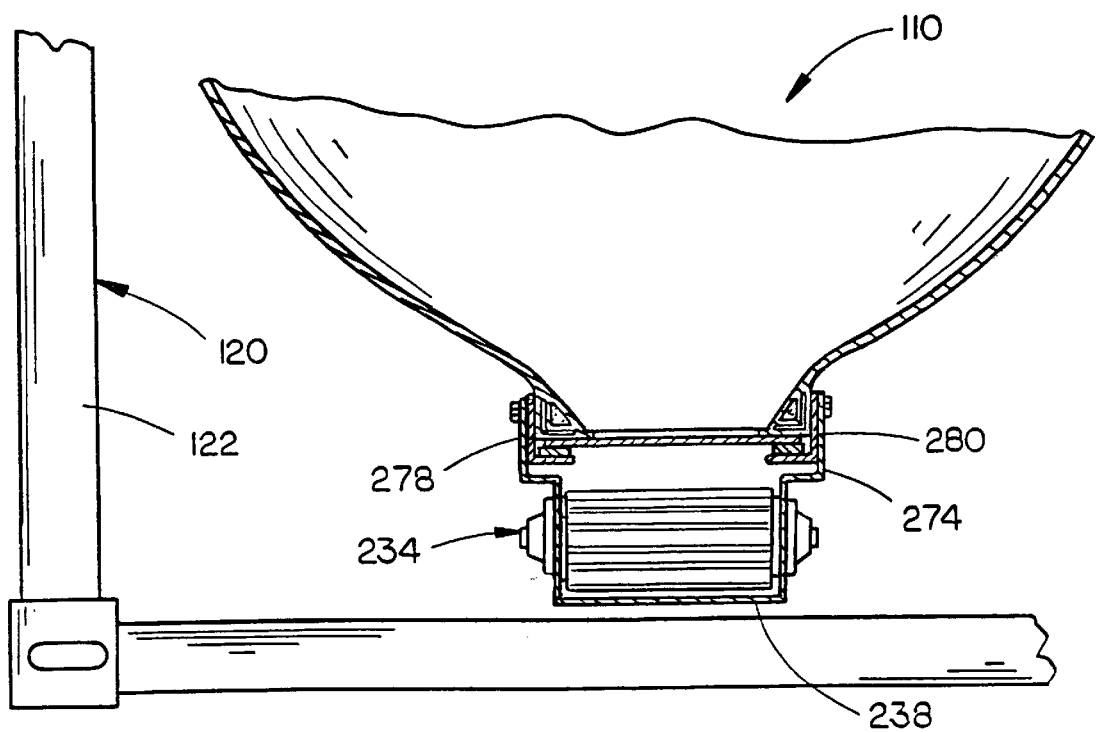
FIG. 12A is a partial cross-sectional elevational view of the hopper of an exemplary bulk cargo container of the present invention further comprising a conveyer assembly.
Figure 12B:
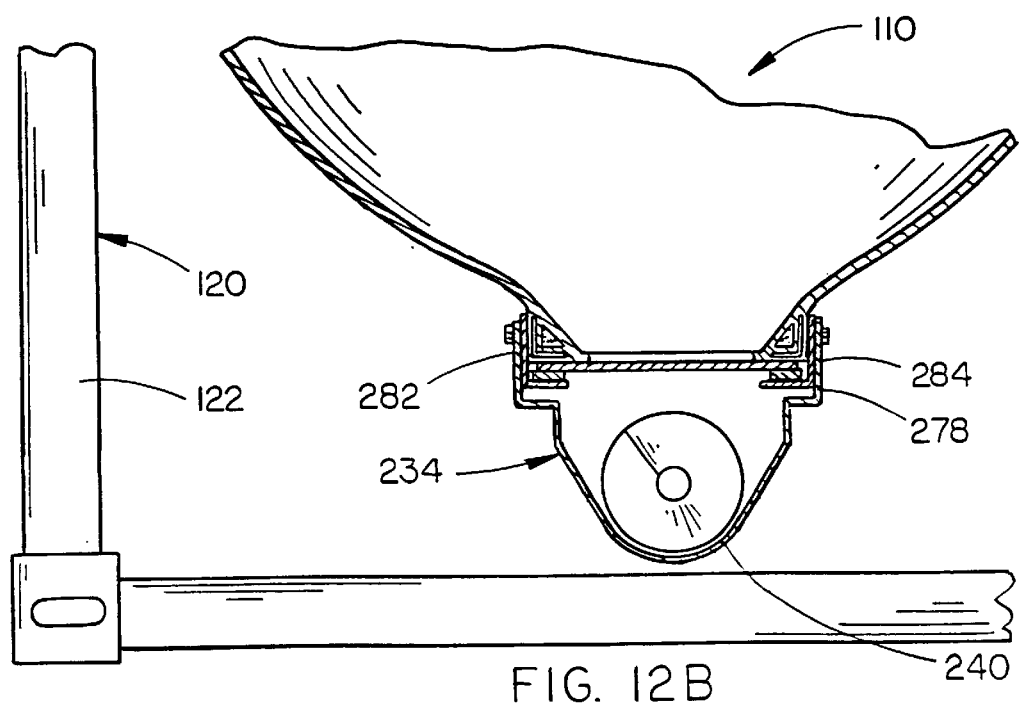
FIG. 12B is a partial cross-sectional end elevational view the hopper of an exemplary bulk cargo container in accordance with the present invention further comprising an auger assembly.

As shown in FIGS. 7, 12A and 12B, additional discharge apparatus 234 such as a conveyor 238 (FIG. 12A) or an auger 240 (FIG. 12B) may be mounted to the reinforcing frame 230 for removing bulk material discharged from the hoppers 110, 112 & 114 through discharge openings 116. Such discharge apparatus 234 may include a supporting frame assembly, for example, conveyor supporting frame assembly 274 (FIGS. 7 and 12A) or an auger supporting frame assembly 276 (FIG. 12B) for mounting the discharge apparatus 234 (i.e., conveyer 238 or auger 240) to the reinforcing frames 230 of the hoppers 110, 112 & 114. As shown in FIG. 7, wherein the container portion 106 of vessel 102 includes more than one hopper 110, 112 & 114, supporting frame assemblies 274 or 276 may mount the discharge assembly to the reinforcing frame 230 of each hopper 110, 112 & 114. Alternately, discharge apparatus 234 may be mounted to less than all of the hoppers 110, 112 & 114 if so desired. As shown in FIGS. 12A and 12B, in an exemplary embodiment, the supporting frame assemblies 274 or 276 may include upper vertical portions 278, 280, 282 & 284 which may be mounted to the reinforcing frame 230 via fasteners 256 which extend through the slide gate mounting brackets 232 into discharge assembly supports 248 (e.g., bolts that are drilled and tapped into the vertical surfaces 252 of the elongated metal angles 250).

It is believed that the of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes. In an exemplary embodiment

What is claimed is:

1. A bulk cargo container, comprising:
   a vessel suitable for containing bulk material, said vessel being formed of fiber reinforced plastic material;
   at least one discharge assembly formed in said vessel, said discharge assembly having an opening suitable for discharging said bulk material;
   a support member formed in said vessel for supporting said vessel and bulk material contained therein, said support member having an inverted generally U-shaped cross-section;
   a frame assembly including a generally horizontally disposed support member attachment engaged by said support member, said support member attachment having an inverted generally U-shaped cross-section;
   a clamping member placed over said engaged support member and support member attachment such that said support member is disposed between said support member attachment and said clamping member; and
   a fastener for securing said clamping member, support member, and support member attachment together;
   wherein said vessel is supported from said support member attachment via said support member so that the weight of said bulk material is carried in tension by said fiber reinforced plastic material; and wherein said support member, said clamping member, and said fastener cooperate to uniformly distribute tensile loads in said fiber reinforced plastic material to said support member attachment.

2. The bulk cargo container as claimed in claim 1, further comprising:

a first layer of an adhesive disposed between said support member and said support member attachment for bonding said support member to said support member attachment; and a second layer of adhesive disposed between said clamping member and said support member, for bonding said clamping member to said support member.

3. The bulk cargo container as claimed in claim 1, further comprising a cover assembly.

4. The bulk cargo container as claimed in claim 3, wherein said cover assembly further comprises an arched upper surface having at least one opening for loading bulk material into said vessel, said opening covered by a door assembly.

5. The bulk cargo container as claimed in claim 1, wherein said discharge assembly comprises a hopper integrally formed in said vessel.

6. The bulk cargo container as claimed in claim 5, further comprising a slide gate assembly mounted to said hopper for covering said opening.

7. The bulk cargo container as claimed in claim 5, further comprising an auger assembly mounted to said hopper for removing said bulk material discharged via said opening.

8. The bulk cargo container as claimed in claim 5, further comprising a conveyer assembly mounted to said hopper for removing said bulk material discharged via said opening.

9. The bulk cargo container as claimed in claim 5, wherein said hopper comprises a reinforcing frame surrounding said opening.

10. The bulk cargo container as claimed in claim 9, wherein said opening is ellipsoidal in shape and said reinforcing frame is rectangular in shape.

11. A bulk cargo container, comprising:

a vessel suitable for containing bulk material, said vessel being formed of fiber reinforced plastic material;

at least one discharge assembly formed in said vessel, said discharge assembly having an opening suitable for discharging said bulk material and comprising a hopper integrally formed in said vessel;

a reinforcing frame disposed in said hopper surrounding said opening, said reinforcing frame including a tension ring internally disposed in said fiber reinforced plastic material for distributing tensile loads in said fiber reinforced plastic material;

a support member formed in said vessel for supporting said vessel and bulk material contained therein;

a frame assembly including a generally horizontally disposed support member attachment engaged by said support member;

a clamping member placed over said engaged support member and support member attachment such that said support member is disposed between said support member attachment and said clamping member; and a fastener for securing said clamping member, support member, and support member attachment together;

wherein said vessel is supported from said support member attachment via said support member so that the weight of said bulk material is carried in tension by said fiber reinforced plastic material; and wherein said support member, said clamping member, and said fastener cooperate to uniformly distribute tensile loads in said fiber reinforced plastic material to said support member attachment.

12. A bulk cargo container, comprising:

a vessel suitable for containing bulk material, said vessel being formed of fiber reinforced plastic material;

at least one discharge assembly formed in said vessel, said discharge assembly having an opening suitable for discharging said bulk material and comprising a hopper integrally formed in said vessel;

a reinforcing frame disposed in said hopper surrounding said opening, said reinforcing frame including a core imbedded in said fiber reinforced plastic material, each side of said core having a generally triangular cross-section for transitioning said fiber reinforced plastic material from said ellipsoidal shape of said opening to said rectangular shape of said reinforcing frame; and a support imbedded in said reinforced plastic material, adjacent to said core;

a support member formed in said vessel for supporting said vessel and bulk material contained therein;

a frame assembly including a generally horizontally disposed support member attachment engaged by said support member;

a clamping member placed over said engaged support member and support member attachment such that said support member is disposed between said support member attachment and said clamping member; and a fastener for securing said clamping member, support member, and support member attachment together;

wherein said vessel is supported from said support member attachment via said support member so that the weight of said bulk material is carried in tension by said fiber reinforced plastic material; and wherein said support member, said clamping member, and said fastener cooperate to uniformly distribute tensile loads in said fiber reinforced plastic material to said support member attachment.

13. The bulk cargo container as claimed in claim 12, further comprising a slide gate assembly including:

a slide gate frame mounted to said reinforcing frame;

a slide gate door slidably disposed in said slide gate frame for covering said opening.

14. The bulk cargo container as claimed in claim 13, further comprising at least one fastener for fastening said slide gate frame to said support to mount said slide gate frame to said reinforcing frame.

15. The bulk cargo container as claimed in claim 12, further comprising an auger assembly including:

an auger frame mounted to said reinforcing frame;

an auger rotatably supported within said auger frame for removing said bulk material discharged via said opening.

16. The bulk cargo container as claimed in claim 15, further comprising at least one fastener for fastening said auger frame to said support to mount said auger frame to said reinforcing frame.

17. The bulk cargo container as claimed in claim 12, further comprising a conveyer assembly including:

a conveyer frame mounted to said reinforcing frame;

a conveyer supported within said conveyor frame for removing said bulk material discharged via said opening.

18. The bulk cargo container as claimed in claim 17, further comprising at least one fastener for fastening said conveyor frame to said support to mount said conveyer frame to said reinforcing frame.

19. The bulk cargo container as claimed in claim 5, wherein at least one side wall of said vessel is curved.

20. The bulk cargo container as claimed in claim 5, wherein the side walls of said hopper radiate outward and upward in straight line radius from said discharge opening at an angle suitable for smooth flow of said material from said hopper.

21. The bulk cargo container as claim 20, wherein said angle of side walls is approximately thirty-three degrees.

22. The bulk cargo container as claimed in claim 20, wherein the side walls of said hopper transition into the side walls of said vessel, and wherein the side walls of said vessel curve upwardly for transferring loads imposed by said bulk materials contained in said vessel to said support member.

23. The bulk cargo container as claimed in claim 22, wherein the side walls of said vessel form an angle with a vertical plane and approach a vertical orientation adjacent to said support member.

24. A bulk cargo container, comprising:
a frame assembly having a support member attachment, said frame assembly further comprising a plurality of stacking members for stacking said frame assembly onto at least one of a second container and a supporting surface;
a vessel held in said frame assembly suitable for containing bulk material, said vessel being formed of fiber reinforced plastic material and including a container portion and a support member;
at least one discharge assembly comprising a hopper integrally formed in said container portion, said hopper having an opening through which bulk material may be discharged; and
a reinforcing frame surrounding said opening, said reinforcing frame including a tension ring internally disposed in said fiber reinforced plastic material;
wherein said vessel is supported from said support member attachment via said support member so that the weight of said bulk material is carried in tension by said fiber reinforced plastic material; and
wherein said tension ring distributes tensile loads in said fiber reinforced plastic material surrounding said opening.

25. The bulk cargo container as claimed in claim 24, wherein said support member attachment and said support member comprise inverted generally U-shaped cross-sections and wherein said support member engages said support member attachment for supporting said vessel.

26. A bulk cargo container, comprising:
a frame assembly including a support member attachment having an inverted generally U-shaped cross-section;
a vessel held in said frame assembly suitable for containing bulk material, said vessel being formed of fiber reinforced plastic material and including a container portion and a support member, having an inverted generally U-shaped cross-section;
at least one discharge assembly comprising a hopper integrally formed in said container portion, said hopper having an opening through which bulk material may be discharged;
a reinforcing frame surrounding said opening, said reinforcing frame including a tension ring internally disposed in said fiber reinforced plastic material;
a clamping member placed over said engaged support member and support member attachment such that said support member is disposed between said support member attachment and said clamping member; and
a fastener for securing said clamping member, support member, and support member attachment together;
wherein said support member, said clamping member, and said fastener cooperate to uniformly distribute tensile loads in said fiber reinforced plastic material to said support member attachment; and
wherein said vessel is supported from said support member attachment via said support member so that the weight of said bulk material is carried in tension by said fiber reinforced plastic material; and
wherein said tension ring distributes tensile loads in said fiber reinforced plastic material surrounding said opening.

27. The bulk cargo container as claimed in claim 26, further comprising:
a first layer of an adhesive disposed between said support member and said support member attachment for bonding said support member to said support member attachment; and
a second layer of adhesive disposed between said clamping member and said support member, for bonding said clamping member to said support member.

28. The bulk cargo container as claimed in claim 26, further comprising a cover assembly, said cover assembly comprising said clamping assembly.

29. The bulk cargo container as claimed in claim 28, wherein said cover assembly further comprises at least one opening for loading bulk material into said vessel and a door assembly for covering said opening.

30. The bulk cargo container as claimed in claim 24, further comprising a slide gate assembly mounted to said hopper for covering said opening.

31. A bulk cargo container, comprising:
a frame assembly having a support member attachment;
a vessel held in said frame assembly suitable for containing bulk material, said vessel being formed of fiber reinforced plastic material and including a container portion and a support member;
at least one discharge assembly comprising a hopper integrally formed in said container portion, said hopper having an opening through which bulk material may be discharged;
a reinforcing frame surrounding said opening, said reinforcing frame including a tension ring internally disposed in said fiber reinforced plastic material;
a slide gate assembly mounted to said hopper for covering said opening; and
an auger assembly mounted to said hopper for removing said bulk material via said opening;
wherein said vessel is supported from said support member attachment via said support member so that the weight of said bulk material is carried in tension by said fiber reinforced plastic material; and
wherein said tension ring distributes tensile loads in said fiber reinforced plastic material surrounding said opening.

32. A bulk cargo container, comprising:
a frame assembly having a support member attachment;
a vessel held in said frame assembly suitable for containing bulk material, said vessel being formed of fiber reinforced plastic material and including a container portion and a support member;

at least one discharge assembly comprising a hopper integrally formed in said container portion, said hopper having an opening through which bulk material may be discharged;

a reinforcing frame surrounding said opening, said reinforcing frame including a tension ring internally disposed in said fiber reinforced plastic material;

a slide gate assembly mounted to said hopper for covering said opening; and a conveyer assembly mounted to said hopper for removing said bulk material via said opening;

wherein said vessel is supported from said support member attachment via said support member so that the weight of said bulk material is carried in tension by said fiber reinforced plastic material; and wherein said tension ring distributes tensile loads in said fiber reinforced plastic material surrounding said opening.

33. The bulk cargo container as claimed in claim 24, wherein said opening is ellipsoidal in shape and said reinforcing frame is rectangular in shape.

34. A bulk cargo container, comprising:

a frame assembly having a support member attachment;

a vessel held in said frame assembly suitable for containing bulk material, said vessel being formed of fiber reinforced plastic material and including a container portion and a support member;

at least one discharge assembly comprising a hopper integrally formed in said container portion, said hopper having an opening through which bulk material may be discharged; and a reinforcing frame surrounding said opening, said reinforcing frame including a tension ring internally disposed in said fiber reinforced plastic material, a core imbedded in said fiber reinforced plastic material, said core having a generally triangular cross-section for transitioning said fiber reinforced plastic material from said ellipsoidal shape of said opening to said rectangular shape of said reinforcing frame; and a support imbedded in said reinforced plastic material, adjacent to said core;

wherein said vessel is supported from said support member attachment via said support member so that the weight of said bulk material is carried in tension by said fiber reinforced plastic material; and wherein said tension ring distributes tensile loads in said fiber reinforced plastic material surrounding said opening.

35. The bulk cargo container as claimed in claim 34, further comprising a slide gate assembly including:

a slide gate frame mounted to said reinforcing frame;

a slide gate door slidably disposed in said slide gate frame for covering said opening.

36. The bulk cargo container as claimed in claim 35, further comprising at least one fastener for fastening said slide gate frame to said support to mount said slide gate frame to said reinforcing frame.

37. The bulk cargo container as claimed in claim 34, further comprising an auger assembly including:

an auger frame mounted to said reinforcing frame;

an auger rotatably supported within said auger frame for removing said bulk material discharged via said opening.

38. The bulk cargo container as claimed in claim 37, further comprising at least one fastener for fastening said auger frame to said support to mount said auger frame to said reinforcing frame.

39. The bulk cargo container as claimed in claim 34, further comprising a conveyer assembly including:

a conveyer frame mounted to said reinforcing frame;

a conveyer supported within said conveyor frame for discharging said bulk material discharged via said opening.

40. The bulk cargo container as claimed in claim 39, further comprising at least one fastener for fastening said conveyor frame to said support to mount said conveyor frame to said reinforcing frame.

41. The bulk cargo container as claimed in claim 24, wherein at least one side wall of said vessel is curved.

42. The bulk cargo container as claimed in claim 24, wherein the side walls of said hopper radiate outward and upward in straight line radius from said discharge opening at an angle suitable for smooth flow of said material from said hopper.

43. The bulk cargo container as claim 42, wherein said angle of side walls is approximately thirty-three degrees.

44. The bulk cargo container as claimed in claim 42, wherein the side walls of said hopper transition into the side walls of said container portion, and wherein the side walls of said container portion curve upwardly for transferring loads imposed by said bulk materials contained in said vessel to said support member.

45. The bulk cargo container as claimed in claim 44, wherein the side walls of said container portion form an angle with a vertical plane and approach a vertical orientation adjacent to said support member.

46. A bulk cargo container, comprising:

an ISO compliant frame assembly having corner fittings suitable for facilitating stacking of said bulk cargo container with other ISO compliant containers;

a vessel formed of fiber reinforced plastic material supported in said frame, said vessel suitable for containing bulk material and including a container portion; and at least one hopper assembly formed in said container portion, said hopper assembly having an opening suitable for discharging said bulk material;

wherein said vessel further comprises a generally horizontally disposed support member and said frame assembly comprises a generally horizontally disposed support member attachment positioned at least adjacent to said support member, and wherein said vessel is supported from said support member attachment via said support member; and wherein said support member attachment and said support member comprise inverted generally U-shaped cross-sections and wherein said support member engages said support member attachment for supporting said vessel.

47. The bulk cargo container as claimed in claim 46, further comprising:

a clamping member placed over said engaged support member and support member attachment such that said support member is disposed between said support member attachment and said clamping member;

a fastener for securing said clamping member, support member, and support member attachment together;

wherein said support member, said clamping member, and said fastener cooperate to uniformly distribute tensile loads in said fiber reinforced plastic material to said support member attachment.

48. The bulk cargo container as claimed in claim 47, further comprising:
a first layer of an adhesive disposed between said support member and said support member attachment for bonding said support member to said support member attachment; and
a second layer of adhesive disposed between said clamping member and said support member, for bonding said clamping member to said support member.

49. The bulk cargo container as claimed in claim 47, further comprising a cover assembly.

50. The bulk cargo container as claimed in claim 49, wherein said cover assembly further comprises a convexly arched upper surface having at least one opening for loading bulk material into said vessel, said opening capable of being covered by a door assembly.

51. The bulk cargo container as claimed in claim 46, further comprising a slide gate assembly mounted to said hopper assembly for covering said discharge opening.

52. The bulk cargo container as claimed in claim 46, further comprising an auger assembly mounted to said hopper assembly for removing said bulk material discharged via said opening.

53. The bulk cargo container as claimed in claim 46, further comprising a conveyer assembly mounted to said hopper assembly for removing said bulk material discharged via said opening.

54. The bulk cargo container as claimed in claim 46, wherein said hopper assembly comprises a reinforcing frame surrounding said opening.

55. The bulk cargo container as claimed in claim 46, wherein said discharge opening is ellipsoidal in shape and said reinforcing frame is rectangular in shape.

56. A bulk cargo container, comprising:
an ISO compliant frame assembly having corner fittings suitable for facilitating stacking of said bulk cargo container with other ISO compliant containers;
a vessel supported in said frame, said vessel formed of fiber reinforced plastic material and being suitable for containing bulk material and including a container portion;
at least one hopper assembly formed in said container portion, said hopper assembly having an ellipsoidal opening suitable for discharging said bulk material and a generally rectangular reinforcing frame surrounding said opening; and
a tension ring internally disposed in said fiber reinforced plastic material about said discharge opening for distributing tensile loads in said fiber reinforced plastic material.

57. A bulk cargo container, comprising:
an ISO compliant frame assembly having corner fittings suitable for facilitating stacking of said bulk cargo container with other ISO compliant containers;
a vessel supported in said frame, said vessel formed of fiber reinforced plastic material and being suitable for containing bulk material and including a container portion; and
at least one hopper assembly formed in said container portion, said hopper assembly having an ellipsoidal opening suitable for discharging said bulk material;
a generally rectangular reinforcing frame surrounding said opening, said reinforcing frame including a core imbedded in said fiber reinforced plastic material, each side of said core having a generally triangular cross-section for transitioning said fiber reinforced plastic material from said ellipsoidal shape of said opening to said rectangular shape of said reinforcing frame, and a support imbedded in said reinforced plastic material, adjacent to said core.

58. The bulk cargo container as claimed in claim 57, further comprising a slide gate assembly including:
a slide gate frame mounted to said reinforcing frame;
a slide gate door slidably disposed in said slide gate frame for covering said opening.

59. The bulk cargo container as claimed in claim 58, further comprising at least one fastener for fastening said slide gate frame to said support to mount said slide gate frame to said reinforcing frame.

60. The bulk cargo container as claimed in claim 59, further comprising an auger assembly including:
an auger frame mounted to said reinforcing frame;
an auger rotatably supported within said auger frame for removing said bulk material discharged via said opening.

61. The bulk cargo container as claimed in claim 60, further comprising at least one fastener for fastening said auger frame to said support to mount said auger frame to said reinforcing frame.

62. The bulk cargo container as claimed in claim 59, further comprising a conveyer assembly including:
a conveyer frame mounted to said reinforcing frame;
a conveyer supported within said conveyor frame for removing said bulk material discharged via said opening.

63. The bulk cargo container as claimed in claim 62, further comprising at least one fastener for fastening said conveyor frame to said support to mount said conveyer frame to said reinforcing frame.

64. The bulk cargo container as claimed in claim 46, wherein at least one side wall of said vessel is curved.

65. The bulk cargo container as claimed in claim 46, wherein the side walls of said hopper radiate outward and upward in straight line radius from said discharge opening at an angle suitable for smooth flow of said material from said hopper.

66. The bulk cargo container as claim 65, wherein said angle of side walls is approximately thirty-three degrees.

67. The bulk cargo container as claimed in claim 65, wherein the side walls of said hopper transition into the side walls of said container portion, and wherein the side walls of said container portion curve upwardly for transferring loads imposed by said bulk materials contained in said vessel to said support member.

68. The bulk cargo container as claimed in claim 67, wherein the side walls of said container portion form an angle with a vertical plane and approach a vertical orientation adjacent to said support member.

* * * * *